United States Patent [19]

Beene et al.

[11] 3,904,833

[45] Sept. 9, 1975

[54] RINGING GENERATOR CIRCUIT WITH CAPACITOR STORAGE

[75] Inventors: Gerald Wayne Beene, Arlington; Tex.

[73] Assignee: Superior Continental Corporation, Hickory, N.C.

[22] Filed: June 4, 1973

[21] Appl. No.: 366,665

[52] U.S. Cl. .............................. 179/84 R; 179/18 F

[51] Int. Cl. ............................................ H04m 1/26

[58] Field of Search ............. 179/17 E, 18 F, 2.5 R, 179/23, 84 R, 84 A; 320/1

[56] References Cited

UNITED STATES PATENTS

| | | | |
|---|---|---|---|
| 3,529,100 | 9/1970 | Jacobs | 320/1 |
| 3,688,038 | 8/1972 | Hugyecz et al. | 179/84 R |

*Primary Examiner*—Thomas A. Robinson

[57] ABSTRACT

A ringing generator circuit in which a capacitor is charged by the central office d.c. power source and in which the charge stored by the capacitor is applied, in response to a ring control signal, to activate the subscriber's ringer or other signalling device to signal an incoming call.

31 Claims, 11 Drawing Figures

RINGING GENERATOR CIRCUIT WITH CAPACITOR STORAGE

FIELD OF INVENTION

This invention relates to circuits and methods for operating a subscriber's telephone ringer or other signalling device that is utilized to signal an incoming call.

BACKGROUND

As is well known, telephone subscriber carrier (sometimes referred to as station carrier systems) provides for the simultaneous transmission of several conversations over the same pair of transmission wires between a central office and a plurality of remotely located subscribers. Typically, the telephone subscriber carrier equipment includes a central office terminal unit and a subscriber terminal unit (sometimes referred to as a line tap unit) for each subscriber to be serviced by the carrier system. The central office terminal units are located at the central office of the telephone company, and each subscriber terminal unit is connected to the telephone transmission line usually within the immediate area of the subscriber's residence.

Prior to the introduction of semiconductor or solid state devices, the remotely located subscriber carrier equipment (namely, the subscriber terminal units) customarily was locally powered by a power source at each subscriber location. This local power source usually was an a.c. power source or a battery which was float charged by a.c. power. This local power source was also used to ring the subscriber's telephone.

With the introduction and advancement of semiconductor devices, it became feasible to operate the subscriber's remotely located carrier equipment directly from power supplied at the central office and transmitted by the telephone transmission line. However, the ringers associated with the subscriber's telephones still required more power than was feasible to supply over the telephone transmission line from the central office. Prior to this invention, therefore, local power at the subscriber's premises was still needed to operate the subscriber's telephone ringer.

The problem of furnishing power to ring the subscriber's telephones became compounded because the trend in telephone usage took a turn toward more telephones per subscriber. Thus, while the introduction of solid state devices reduced the power needed to operate the subscriber's carrier equipment, the increase in the number of telephones per subscriber increased the ringing load.

The normally accepted solution to this problem was to keep a local battery at the subscriber's location for ringing the subscriber's telephones and to utilize the usually long periods of idle time of the telephone circuit to charge the battery at low current rates.

This solution was usually satisfactory in mild climates or in systems in which the equipment was mounted inside a heated residence. In cold climates, however, the storage capacity of the local battery and its ability to accept a charge are decreased significantly when the battery is subjected to low ambient temperatures. This inherent shortcoming of batteries became more problematic with the increased ringing load that resulted from the increase in the number of telephones per subscriber.

Thus, the primary problem in prior systems is the inability of batteries to provide adequate ringing power when subject to low temperatures such as −10° F. Furthermore, variations in the battery voltage and ringing load results in poor frequency stability. Also, the cost of the battery and associated magnetics in a battery powered ringing supply is relatively high. Finally, the overall size of the battery and the associated magnetics is relatively large, thus requiring a relatively large package to house the equipment.

SUMMARY AND OBJECTS OF INVENTION

With the foregoing background in mind, a major object of this invention is to provide a novel circuit which eliminates the necessity of providing a local battery or storage cell for ringing one or more telephones at the subscriber's residence or location.

The circuit of this invention is electrically connected to the telephone transmission line at the subscriber's location and includes a capacitor which is charged by the central office d.c. power source which is electrically connected to the transmission line at the central office. This central office d.c. power source usually supplies the power for operating the subscriber carrier equipment and other equipment at the central office. In response to a pre-selected, central office-transmitted signal, the circuit of this invention is effective to apply the charge which is stored by the capacitor to operate the ringer or other signalling device which is associated with each of the subscriber's telephones to signal an incoming call.

Accordingly, another important object of this invention is to provide a novel circuit and method in which the central office d.c. power source provides the emf for charging a capacitor at the subscriber's location and in which the charge stored by the capacitor is applied to activate each of the subscriber's ringers or other signalling devices in response to a pre-selected central office-transmitted signal.

Another object of this invention is to provide a novel circuit and method that eliminates the previously outlined shortcomings of batteries or storage cells by utilizing the short term energy storage capability of a capacitor to provide the energy needed to ring the subscriber's telephone or telephones.

According to a further important object of this invention, the input power for storing an adequate charge on the capacitor is reduced by charging the capacitor during both the alternate ringing and silent intervals of the telephone ringer. As is well known, the central office ring generator circuit is effective to supply an intermittent or periodic ringing signal upon dialing a subscriber. The interval when this ringing signal is present is customarily referred to as the ringing interval, and the interval when the ringing signal is absent is customarily referred to as the silent interval. The silent interval is not to be confused with the idle time of the telephone circuit.

The effect of this periodic ringing signal is to establish the typical, cyclic, ring-pause-ring-pause operation of the telephone ringer in which the telephone alternately rings and pauses. Power is therefore drawn by the ringer only during the ringing interval.

The time durations of the ringing and silent intervals are pre-selected and may be one second and two seconds, respectively. In a preferred embodiment of this invention, the capacitor is charged during both the ringing and silent intervals so that the voltage across a capacitor will be built back up during the silent interval when no power is being drawn from capacitor to ring the telephone. In this manner, the level of the input power is significantly less than what it would have to be if advantage were not taken of the silent interval when the ringer is not drawing power.

This invention, therefore, has the advantage of eliminating the need for a local battery ringing supply and the attendant disadvantages of a local battery ringing supply. It also has the advantage of enabling the capacitor-charging level of the input power to be significantly less than the power that is drawn to ring the telephone.

From the detailed description of this invention it will be appreciated that the ringing generator circuit of this invention may be utilized to activate various types of signalling devices such as, for example, a buzzer, a lamp and/or a ringer.

Further objects and advantages of this invention will appear as the description proceeds in connection with the below-described drawings and the appended claims.

DETAILED DESCRIPTION

Figures 1, 2:
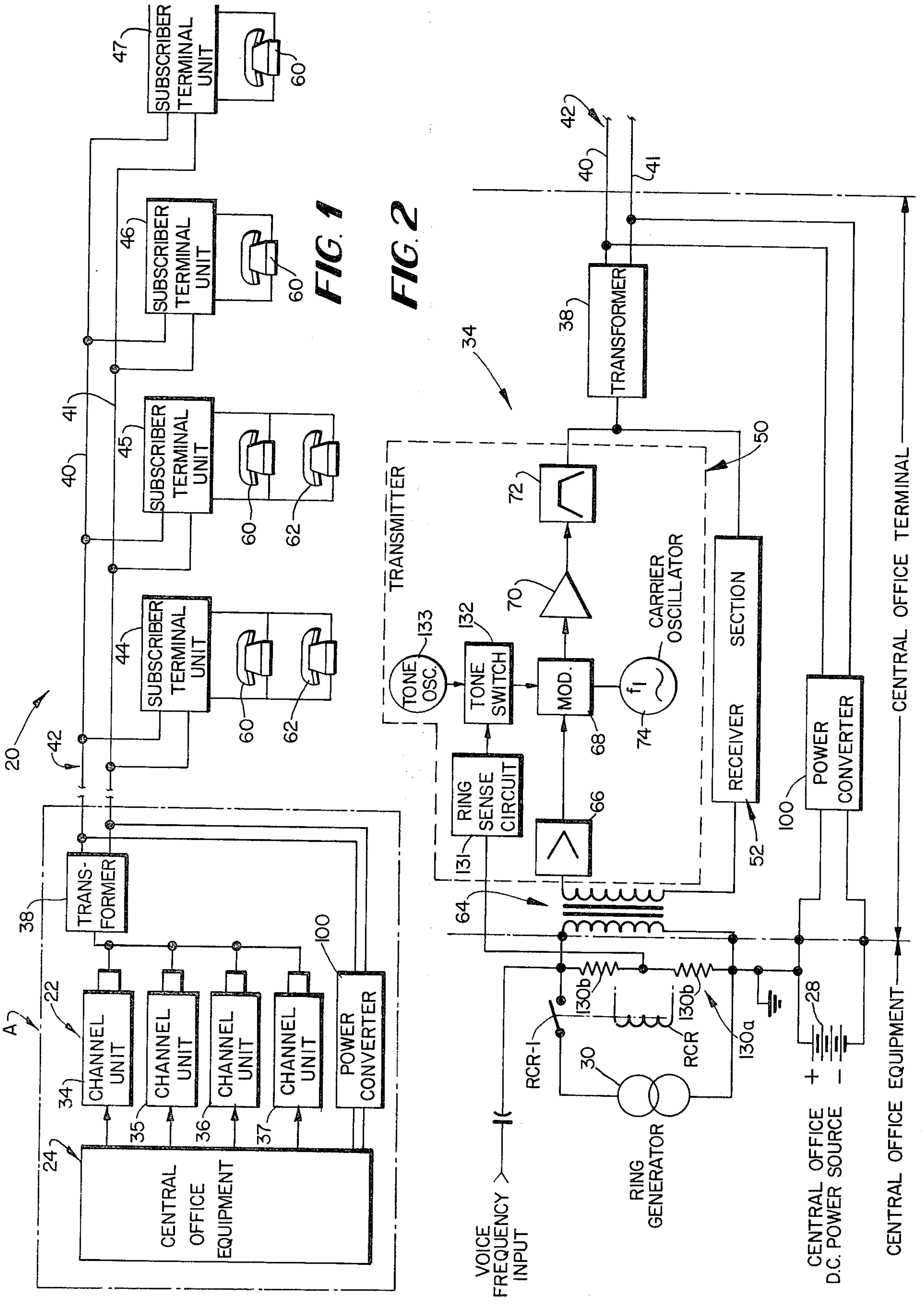
FIG. 1 is a schematic circuit defined in of a carrier system incorporating the principles of this invention.
FIG. 2 is a schematic circuit diagram of one of the central office terminal units and a part of the central office equipment in the central office station shown in FIG. 1.

Referring to FIG. 1, a telephone carrier system incorporating the principles of this invention is generally designated at 20 and comprises a conventional central office terminal 22 which is located at a conventional central office station A. Station A also has the customary telephone exchange equipment which is indicated at 24.

As shown in FIG. 2, the telephone exchange equipment 24 includes, among other things, a central office D.C. power supply source 28, a ringing generator 30, and a ring control relay RCR. In this embodiment, ringing generator 30 provides for single party ringing. Another embodiment (see FIGS. 5 and 6) to be described later on provides for multi-party ringing. It will be appreciated that the central office station may be equipped to provide for both single party and multi-party ringing.

The d.c. power supply source 28 may be any suitable meanas for supplying d.c. voltage and is symbolically illustrated as a battery in the drawings. Source 28 may be, for example, a rectifier or a d.c. generator.

The central office terminal 22 includes a plurality of carrier channel units. Four carrier channel units are shown in this example and are indicated at 34, 35, 36, and 37 in FIG. 1. Channel units 34-37 are electrically connected through a transformer circuit 38 to conductors 40 and 41 of a two-conductor transmission line 42.

Connected to transmission line 42 at various locations are a plurality of subscriber terminal units 44, 45, 46 and 47. Units 44-47 and line 42 form a part of system 20, and units 44-47 are connected in parallel across conductors 40 and 41 at locations that are customarily remote from the central office station A.

Units 34-37 and 44-47 are conventional and may be the same as that described in U.S. Pat. No. 3,475,561 issued to L. Q. Krasin et al on Oct. 28, 1969 for Telephone Carrier System Having Self-Contained Independently Attachable Line Tap Units. It will be appreciated that any suitable central office equipment and any suitable carrier equipment may be utilized in conjunction with this invention.

Figure 3:
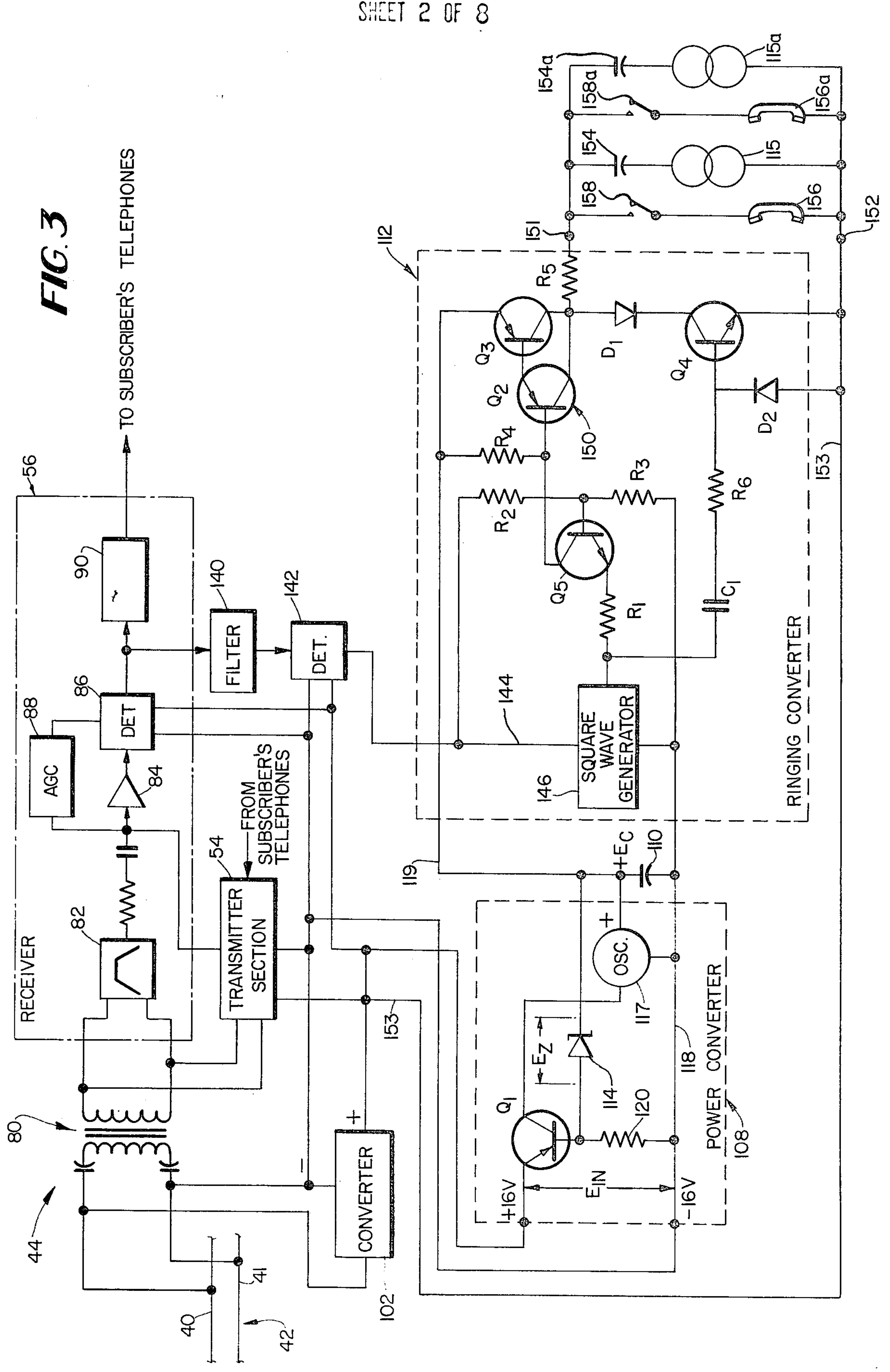
FIG. 3, which illustrates the ringing generator circuit of this invention, is a schematic circuit diagram of one of the subscriber terminal units shown in FIG. 1 (the circuits shown in FIGS. 2 and 3 provide for single party ringing)

As shown in FIG. 2, each of the carrier channel units 34-37 includes a conventional transmitter section 50 and a conventional receiver section 52. Similarly, each of the subscriber terminal units 44-47, as shown in FIG. 3, includes a conventional transmitter section 54 and a conventional receiver section 56.

For a detailed explanation of the construction and operation of units 34-37 and 44-47, reference is made to the previously identified patent 3,475,561, the contents of which are herein incorporated by express reference.

In brief, the transmitter section in each of the units 34-37 and 44-47 generates and transmits its own carrier waveform. The frequencies of the carrier waveforms generated and transmitted by units 34-37 are different from each other. Likewise, the frequencies of the carrier waveforms generated and transmitted by units 44-47 are different from each other. The receiver section 56 of each of the units 44-47 is tuned to only one of the carrier frequencies generated by the transmitter sections 50 of units 34-37. Similarly, the receiver section 52 of each of the units 34-37 is tuned to only one of the carrier frequencies generated by the transmitter sections of units 44-47. Thus, each of the units 44-47 detects the carrier frequency energy that is sent down line 42 from only a pre-selected one of the units 34-37, and each of the units 34-37 detects the carrier frequency energy that is sent back to the central office station A from only a pre-selected one of the units 44-47.

The subscriber telephones are generally indicated at 60 in FIG. 1 and are connected one to each of the units 44-47. Usually, some of the subscribers, and in certain instances all of the subscribers, have extension telephones. These extension telephones are indicated at 62 in FIG. 1. For each of the subscribers having one or more extension telephones 62, each extension telephone is connected in parallel with the main telephone 60 to its associated subscriber terminal unit.

As shown in FIG. 2, the transmitter and receiver sections 50 and 52 of unit 34 are electrically connected to the central office switching and signalling equipment by any suitable means such as a hybrid transformer 64. The transmitter section 50 of unit 34 includes, among other things, a modulator 68, a carrier frequency amplifier 70, a band pass filter 72, and an oscillator 74. Section 50 may also include a compressor 66. The input of compressor 66 is connected to the secondary of transformer 64 and the output of compressor 66 is connected to the input of modulator 68. The output of modulator 68 is connected to the input of amplifier 70, and the output of amplifier 70 is connected to the input of filter 72. The output of filter 72 is connected through transformer 38 to transmission line 42. Oscillator 74, which generates the carrier signal or waveform, is connected to modulator 68 to provide for the transmission of a pre-selected carrier frequency $f_1$.

The transmitter sections of units 35-37 are the same as that just described for the transmitter section of unit 34. In addition, the transmitter and receiver sections of units 35-37 are connected to the central office equipment and to transmission line 42 in the same manner as that just described for unit 34. It will be appreciated that the carrier frequency oscillators in the transmitter sections of units 34-37 generate the carrier waveforms at frequencies that are different from each other.

As shown in FIG. 3, subscriber terminal unit 44 includes a carrier frequency coupling transformer 80. The receiver section 56 of unit 44 includes a band pass filter 82, a carrier frequency amplifier 84, a detector 86 and an automatic gain control feedback circuit 88. The primary winding or transformer 80 is capacitively coupled to conductors 40 and 41, and the secondary of transformer 80 is connected to the receiver and transmitter sections of unit 44 as shown. The signals coupled through transformer 80 are applied to the input of filter 82. The output of filter 82 is connected to the input of amplifier 84. The output of amplifier 84 is connected to the input of detector 86. The automatic gain control circuit 88 is connected between an output of detector 86 and the input of amplifier 84.

Still referring to FIG. 3, the voice frequency output of detector 86 is applied to a circuit 90 that filters, expands and amplifies the voice frequency signal that is developed by detector 86. Circuit 90 is connected to the subscriber's telephone in the usual manner to supply the voice frequency information to the subscriber. It will be appreciated that the compressor 66 in the central office unit and the unshown expander in circuit 90 are optional.

From the circuit thus far described it will be appreciated that the voice frequency waveform coupled into compressor 66 is compressed by the compressor and applied to modulator 68 where the compressed voice frequency waveform modulates the carrier waveform that is generated by oscillator 74. The modulated carrier waveform is then applied through amplifier 70 and filter 72 to transmission line 42. This modulated carrier waveform is received by unit 44 where it is coupled through transformer 80 to the input of filter 82. Filter 82 passes only the carrier frequency and side band components of the associated central office carrier channel unit (which is unit 34 in this example), while rejecting all other frequencies. The modulated carrier frequency waveform that passes through filter 82 is amplified by amplifier 84 and applied to the input of detector 86. Detector 86 detects, or demodulates, the modulated carrier waveform by half-wave rectifying it and then by integration, removing the carrier frequency component and leaving only the voice frequency component. The voice frequency signal recovered by detector 86 is applied to circuit 90 where it is expanded and amplified and then applied to the subscriber's telephones.

The central office d.c. source 28 conventionally provides the d.c. power for operating units 34-37, other central office equipment, and the transmitter and receiver sections 54 and 56 in units 44-47. The complete circuit for applying the d.c. source voltage to the equipment in Station A is not shown. In addition, source 28, in accordance with this invention, also supplies d.c. power for operating the ringers or other signalling devices at the subscriber's telephones.

In the embodiment shown in FIGS. 1-3, source 28 is connected to the input of a conventional d.c.-to-d.c. converter 100 (FIG. 2) at terminal 22. Converter 100 steps up the potential of source 28 to supply a high d.c. voltage output. The high voltage output of converter 100 is electrically connected across conductors 40 and 41 to supply the operating current to units 44-47.

Each of the units 44-47 is provided with a conventional d.c.-to-d.c. converter which steps down the high d.c. voltage on line 42 to a relatively low d.c. voltage. This low d.c. voltage may be approximately ±16 volts. In FIG. 3, this step down d.c.-to-d.c. converter is indicated at 102.

The input of converter 102 is connected to conductors 40 and 41 at the input terminals to unit 44. The low voltage output of converter 102 is connected to detector 86 and to other equipment in the transmitter and receiver sections 54 and 56 to thereby apply low d.c. voltage for operating sections 54 and 56.

As shown in FIG. 3, the ringing generator circuit of this invention forms a part of unit 44 and comprises a d.c.-to-d.c. power converter 108, a storage capacitor 110 and a ringing converter 112. As will be described in detail shortly, converter 108 charges capacitor 110, and the charge on capacitor 110 is utilized to ring the ringers 115 and 115*a* of telephones 60 and 62 respectively. Operation of ringers 115 and 115a is under the control of ringing converter 112.

Power converter 108 comprises a PNP transistor $Q_1$, a zener diode 114 and a blocking oscillator 117. The emitter of transistor $Q_1$ is connected to the positive output terminal of converter 102, and the collector of transistor $Q_1$ is connected to the positive input terminal of oscillator 117. A common conductor 118 for power converter 108, capacitor 110 and ringing converter 112 is connected to the negative terminal of converter 102. The base of transistor $Q_1$ is connected to the anode of diode 114 and through a biasing resistor 120 to conductor 118.

Conductor 118 is connected to the negative operating terminal of oscillator 117 and to the one plate of capacitor 110. The other plate of capacitor 110 is connected to the positive output terminal of oscillator 117, to the cathode of diode 114, and by a conductor 119 to the emitter of a PNP transistor $Q_3$ in ringing converter 112.

Oscillator 117 steps up the relatively low voltage from converter 102 to supply positive, high voltage pulses of constant repetition frequency at its positive output terminal for charging capacitor 110 up to a voltage that is determined by diode 114. The excursion of the pulses supplied by oscillator 117 is from zero volts to some positive voltage that is significantly higher than the voltage applied to the input of oscillator 117.

In one example that utilizes the 16 volt output of converter 102, the zener potential of diode 114 is 160 volts, and capacitor 110 is a 175 volt capacitor having a capacitance of 300 microfarads. With the 16 volt d.c. output from converter 102, the d.c. voltage applied to the input of oscillator 117 will be approximately +15.4 volts with respect to ground.

It will be appreciated that in place of oscillator 117 any other suitable type of d.c.-to-d.c. converter or multivibrator may be utilized for supplying the voltage needed to charge capacitor 110.

As will be described in detail shortly, ringing converter 112 is responsive to a single party ring control signal 144 (See FIG. 4) to ring ringers 115 and 115*a* with the charge that is stored on capacitor 110. This single party ring control signal is developed in the manner described below.

In response to dialing the subscriber who is serviced by unit 44, the central office ring control relay RCR is operated to close its contacts RCR-1 (See FIG. 2). Closure of contacts RCR-1 electrically connects ringing generator 30 across a voltage divider 130*a* which constitutes part of the central office carrier equipment. Divider 130*a* consists of a pair of series connected resistors 130*b* which are connected across the output terminals of generator 30 when contacts RCR-1 are closed. Generator 30 generates a typical central office a.c. ringing signal. The waveform of this a.c. ringing signal is indicated at 130 in FIG. 4. The a.c. ringing signal voltage supplied by generator 30 is applied across voltage divider 130a upon closing contacts RCR-1.

As shown, the central office ringing signal 130 is periodic in that it has alternate ringing and silent intervals. During the ringing interval the ringing signal is present, and during the momentary silent interval the ringing signal is absent. The manner in which this central office a.c. ringing signal is generated is conventional.

Figure 4:
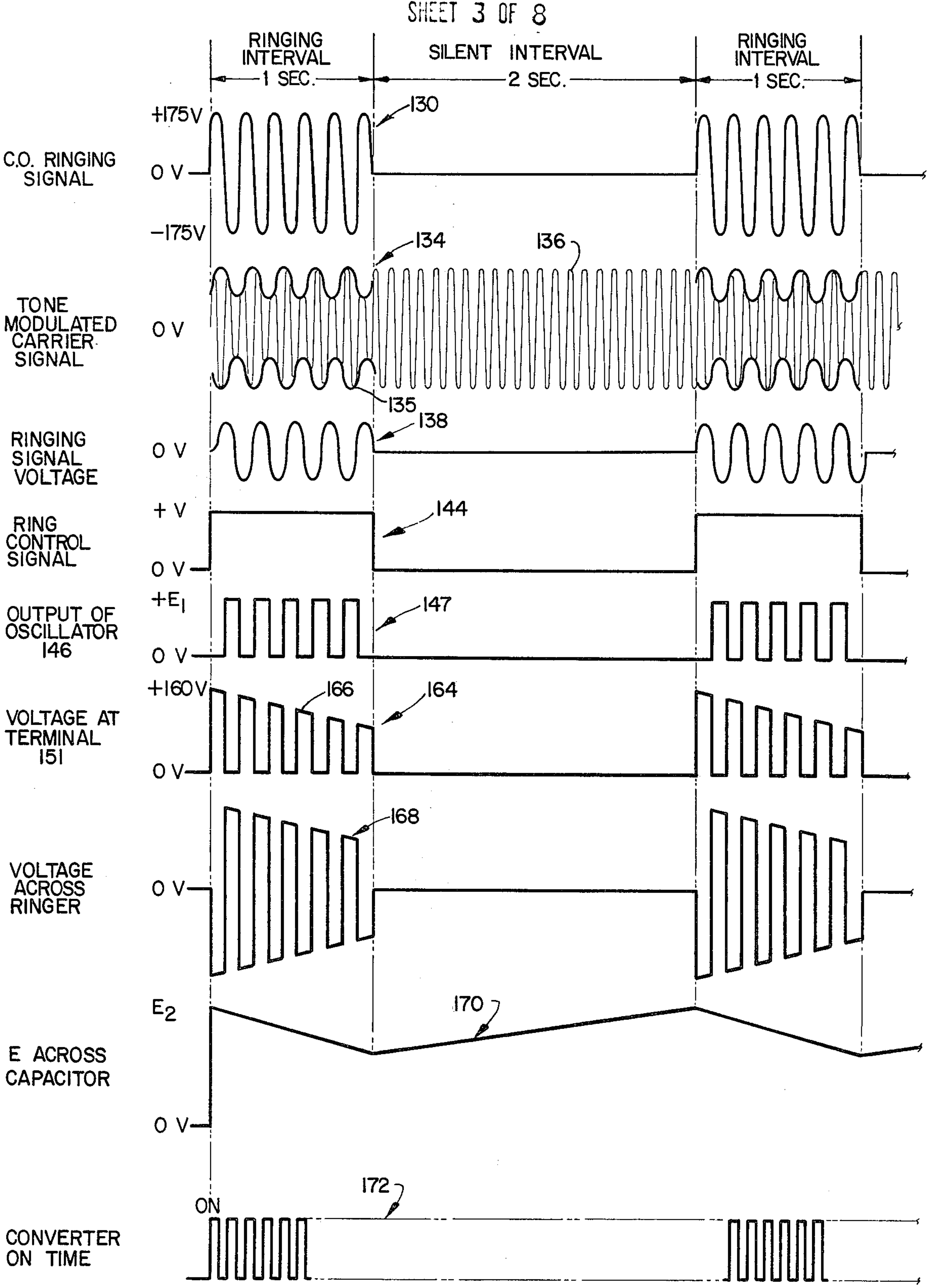
FIG. 4 is a waveform diagram which graphically illustrates various signals that are developed in the circuits of FIGS. 2 and 3.

As shown in FIG. 4, the duration of the ringing interval of ringing signal 130 customarily is one second, while the duration of the silent interval of ringing signal 130 customarily is two seconds. Thus, the period of the ringing and silent intervals is three seconds. The voltage of the a.c. ringing signal 130 may be 80 volts rms. A conventional ring sense circuit 131, which has an input connected to the interconnected terminals of resistors 130b, is effective to sense the presence of ringing signal 130.

Upon sensing signal 130 circuit 131 is effective to turn on a tone switch 132 to connect a tone oscillator 133 to modulator 68. Thus switch 132 will be on during the one second ringing interval of signal 130. During the two second silent interval switch 132 will be off to disconnect oscillator 133 from modulator 68. The tone generated by oscillator 133 is therefore applied to modulate the carrier signal only during the one second ringing interval of signal 130. The frequency of the tone which is generated by oscillator 133 may be 750 cps.

As a result, the carrier signal, which is continuously generated by oscillator 74, will be modulated periodically by the 750 cycle tone at intervals corresponding to the ringing intervals of the ringing signal 130. Thus, the carrier signal will be modulated by the 750 cycle tone for one second and will be unmodulated for two seconds.

The waveform of the 750 cycle modulated carrier signal, as it appears at the output of transmitter 50, is indicated at 134 in FIG. 4. The modulated intervals of the carrier signal are indicated at 135, and the unmodulated intervals of the carrier signal are indicated at 136.

In this embodiment the carrier signals are continuously generated by units 34-37 and are continuously transmitted down transmission line 42 to units 44-47. Thus, the tone-modulated carrier signal 134, which is transmitted by unit 34, will pass down line 42 for reception by subscriber terminal unit 44 which is turned to the carrier frequency of unit 34. The modulated carrier signal therefore passes through filter 82 of unit 44 and is applied to detector 86. Detector 86 detects, or demodulates, the tone-modulated carrier signal 134 to develop a 750 cycle ringing signal voltage 138 (see FIG. 4) at its voice frequency output. Detector 86 is effective to smooth out the carrier signal but not the 750 cycle tone that was imposed on the carrier signal.

Ringing signal voltage 138 corresponds to the 750 cycle tone that was applied to modulate the carrier signal. Signal voltage 138 is intermittent and has the same ringing and silent intervals as that of the central office a.c. ringing signal 130.

As shown in FIG. 3, signal voltage 138 is applied to the input of a further filter 140 which is connected to the voice frequency output of detector 86. Filter 140 is tuned to pass only signal voltage 138 to a further detector 142 whose input is connected to the output of filter 140.

Detector 142 detects the presence or absence of signal voltage 138 and smooths out signal voltage 138 to develop the ring control signal 144 at its output. The circuit for developing ring control signal 144 is conventional.

As shown in FIG. 4, ring control signal 144 is a square wave having some pre-selected positive value throughout the substantially coincident ringing intervals of signals 130 and 138. During the substantially coincident silent intervals of signals 130 and 138, ring control signal 144 is at zero volts. Ring control signal 144 may be developed in various different ways that are known in the art.

As shown in FIG. 3, ring control signal 144 is applied to one input terminal of a square wave generator 146 which forms a part of ringing converter 112. The other input terminal of generator 146 is connected to conductor 118.

Generator 146 will be turned on by ring control signal 144 when signal 144 is positive to generate a zero-to-positive voltage square wave pulse train which is indicated at 147 in FIG. 4. The frequency of the pulses generated by generator 146 is constant. When ring control signal 144 is at zero volts during the silent intervals of signal 138, generator 146 will be turned off to thereby stop the generation of pulse train 147.

Ringing converter 112 further includes an NPN transistor $Q_4$, another NPN transistor $Q_5$, PNP transistors $Q_2$ and $Q_3$ which constitute a Darlington, voltage divider resistors $R_2$ and $R_3$, biasing resistors $R_1$, $R_4$, and $R_6$, a capacitor $C_1$ a pair of diodes $D_1$ and $D_2$, and a voltage dropping resistor $R_5$.

Still referring to FIG. 3, the output of generator 146 is connected through resistor $R_1$ to the emitter of transistor $Q_5$ and also to one plate of capacitor $C_1$. The other plate of capacitor $C_1$ is connected through resistor $R_6$ to the base of transistor $Q_4$ and to the cathode of diode $D_2$.

The collector of transistor $Q_5$ is connected to the base of transistor $Q_2$. The collectors of transistors $Q_2$ and $Q_3$ are interconnected, and the emitter of transistor $Q_2$ is connected to the base of transistor $Q_3$. With these circuit connections it will be appreciated that transistors $Q_2$ and $Q_3$ form a Darlington which is indicated at 150 in FIG. 3.

Still referring to FIG. 3, resistors $R_2$ and $R_3$, which form a voltage divider, are connected in series between the output of detector 142 and conductor 118. The base of transistor $Q_5$ is connected to the interconnected terminals of resistors $R_2$ and $R_3$.

One terminal of resistor $R_4$ is connected to the collector of transistor $Q_5$ and to the base of transistor $Q_2$. The other terminal of resistor $R_4$ is connected to the emitter of transistor $Q_3$ and to that plate of capacitor 110 which is connected to the positive output terminal of oscillator 117. Resistor $R_4$ is connected across the base of transistor $Q_2$ and the emitter of transistor $Q_3$.

As shown in FIG. 3, one terminal of resistor $R_5$ is connected to the ringing output terminal 151 of unit 44. The other terminal of resistor $R_5$ is connected to the commonly connected collectors of transistors $Q_2$ and $Q_3$ and to the anode of diode $D_1$.

The other ringing output terminal of unit 44 is indicated at 152 and is connected by a conductor 153 to the emitter of transistor $Q_4$, the anode of diode $D_2$, and to the positive output terminal of converter 102.

Still referring to FIG. 3, the subscriber's telephone 60 includes ringer 115, a capacitor 154, the telephone handset 156 and the telephone hook switch which is indicated at 158. Handset 156 and hook switch 158 are connected in series across terminals 151 and 152. Ringer 115 and capacitor 154 are connected in series across terminals 151 and 152 in parallel with handset 156 and hook switch 158.

Extension telephone 62 is the same as telephone 60. Accordingly, like reference numerals suffixed by the letter *a* have been applied to designate like parts of telephone 62.

As will be explained in greater detail shortly, transistors $Q_3$ and $Q_4$ will alternately be switched into conduction in response to pulse train 147. When transistor $Q_3$ is in its conductive state, it completes a circuit to charge capacitors 154 and 154*a* from the charge that is stored on capacitor 110. As a result, current will flow in one direction through ringers 115 and 115*a*. When transistor $Q_4$ is in its conductive state, it completes a discharging circuit for capacitors 154 and 154a, thus causing current to flow in the opposite direction through ringers 115 and 115*a*.

At the moment when d.c. power is first supplied to units 34-47 and 44-47 by d.c. source 28 to place carrier system 20 in an operating condition, there will be no charge on capacitor 110. Upon applying the stepped up d.c. voltage to transmission line 42, converter 102 will supply the low d.c. voltage to activate transmitter and receiver sections 54 and 56 and to bias transistor $Q_1$ into conduction by the applied negative voltage at the base of the transistor.

With transistor $Q_1$ conducting, low d.c. voltage (15.4 volts in this example) will be applied to the input of oscillator 117 to turn the oscillator on. Thus, capacitor 110 will be charged by the positive pulses which are generated by oscillator 117 to build up the voltage across the capacitor. Initially, capacitor 110 will be charged by current flow through the emitter and base of transistor $Q_1$ and through diode 114 because diode 114 initially is forward biased and conducting.

When capacitor 110 is charged to a value of about 15 volts for this example, diode 114 will become reverse biased and hence non-conductive. At this time transistor $Q_1$ will still be conductive to apply the voltage for powering oscillator 117. Oscillator 117 therefore continues to generate pulses to continue the charging of capacitor 110. The voltage or potential difference consequently continues to build up across capacitor 110 until the positve capacitor voltage $+E_c$ at the positively charged plate of capacitor 110 reaches the summation of the positive input voltage $+E_{in}$ and the zener potential ($E_z$) of diode 114. In this example, the positive input voltage is approximately +15.4 volts with respect to ground, while the zener potential is 160 volts as previously mentioned.

When the positive capacitor voltage $E_c$ closely approaches or becomes substantially equal to the summation of voltages $E_z$ and $E_{in}$, diode 114 begins to conduct in its reverse avalanche mode to make the voltage at the base of transistor $Q_1$ more positive than what the base bias was when diode 114 was non-conductive. As a result, transistor $Q_1$ will become less conductive.

Thus, as the output of oscillator 117 tries to drive the capacitor voltage $+E_c$ more positive with respect to ground, the conduction of diode 114 in its avalanche mode causes the bias on the base of transistor to become more positive. As a result, transistor $Q_1$ will progressively become less conductive to reduce the input current to oscillator 117 and to thereby reduce the output voltage of oscillator 117.

Zener diode 114 is therefore effective to stabilize the potential drop across capacitor 110 in the sense that the voltage $E_c$ will be held at approximately 175 volts with respect to ground. In absence of diode 114, capacitor 110 would be charged to the available voltage that could be supplied by oscillator 117, and the applied voltage could exceed the working voltage of capacitor 110 to cause damage to the capacitor.

Except for leakage, the charge will remain stored on capacitor 110 as long as transistor $Q_3$ is non-conductive. If leakage results in a reduction of the capacitor voltage $E_c$ from its stabilized value of 175 volts, diode 114 will become reverse biased to allow transistor $Q_1$ to again be biased into conduction. As a result, the voltage at the output of oscillator will rise, and capacitor 110 will be re-charged.

Upon dialing the subscriber who is serviced by unit 44, the single party ring control signal 144 will be developed in unit 44 and will be applied to the input of oscillator 146 in the manner previously described. During the one second ringing interval, generator 146 is turned on by the positive state of ring control signal 144 to generate the positive pulses 147 as previously explained. The power for operating generator 146 is supplied by signal 144.

The pulse train generated by generator 146 is applied through resistor $R_1$ to the emitter of transistor $Q_5$. The voltage applied at the emitter of transistor $Q_5$ will therefore alternate between zero voltas and some suitable pre-selected positive voltage corresponding to the magnitude ($+E_1$) of the pulses generated by generator 146. The voltage applied to the base of transistor $Q_5$ is determined by the magnitude of signal 144 and the voltage divider which is defined by resistors $R_2$ and $R_3$. Thus, the voltage applied to the base of transistor $Q_5$ will be some proportion of the positive value of signal 144.

Parameters are so selected that when the voltage of pulse train 147 is at its positive value $+E_1$ the voltage applied to the emitter of transistor $Q_5$ will be more positive than the voltage applied to the base of transistor $Q_5$. As a result, transistor $Q_5$ will be non-conductive whenever the output of generator 146 is at its positive value $+E_1$.

When the pulse train 147 changes to its zero voltage state, the voltage applied to the emitter of transistor $Q_5$ will be less positive than the voltage applied to the base of transistor $Q_5$. As a result, transistor $Q_5$ will be switched into conduction. Transistor $Q_5$ will therefore be switched alternately into conduction and non-conduction by pulse train 147.

When transistor $Q_5$ is conducting it develops a voltage drop in a negative direction across resistor $R_4$ to switch transistor $Q_2$ into conduction. By turning transistor $Q_2$ on, transistor $Q_3$ is switched into conduction to complete a circuit for discharging capacitor 110 through resistor $R_5$ to charge capacitors 154 and **154*a*.**

When transistor $Q_5$ is non-conductive, transistor $Q_2$ will be turned off, and by turning off transistor $Q_2$, transistor $Q_3$ will be rendered non-conductive. Thus, transistor $Q_3$ will periodically be switched into conduction in response to the pulse train that is generated by oscillator 146. Whenever the output of generator 146 is at zero volts and the voltage of ring control signal 144 is positive, transistor $Q_3$ will be in its conductive state to connect the circuit containing ringers 115 and **115*a* and capacitors 154 and 154*a* to capacitor 110.**

Each positive pulse ($+E_1$) that is supplied by generator 146 is coupled through capacitor $C_1$ and is applied to the base of transistor $Q_4$ to switch transistor $Q_4$ into conduction. When the output of generator 146 goes to zero volts, the bias on the base of transistor $Q_4$ is removed to render transistor $Q_4$ non-conductive.

Transistors $Q_3$ and $Q_4$, therefore, will alternately conduct so that when transistor $Q_3$ is conducting, transistor $Q_4$ will be turned off and when transistor $Q_4$ is conducting, transistor $Q_3$ will be turned off. By switching transistor $Q_4$ into conduction a discharging circuit is completed for capacitors 154 and **154*a*. Capacitor $C_1$ will be charged by each positive pulse from oscillator 146. At the moment when the output of generator 146** goes to zero volts, therefore, the voltage at the cathode of diode $D_2$ will be negative relative to the voltage at its anode. As a result, diode $D_2$ will conduct to provide a discharge path for discharging capacitor $C_1$.

When transistor $Q_3$ is conductive the charge stored on capacitor 110 will cause current to flow through the emitter-collector of transistor $Q_3$ and through resistor $R_5$ to build up the voltage across capacitors 154 and **154*a*. As a result, current flow in one direction through ringers 115 and 115a to operate ringers 115 and 115*a*. Since transistor $Q_4$ is nonconductive when transistor $Q_3$ is conductive, capacitor 110 cannot discharge through transistor $Q_4$. When transistor $Q_3$ is turned off and transistor $Q_4$ is switched into conduction, the charge on capacitors 154 and 154*a* will be discharged through resistor $R_5$, diode $D_1$ and the collector-emitter of transistor $Q_4$. As a result, current will flow in the opposite direction through ringers 115 and 115a to continue the operation of ringers 115 and 115**a.

Within the one second ringing interval when ring control signal 144 is positive, transistors $Q_3$ and $Q_4$ will each be switched on and off several times. As a result, a series of positive pulses will be applied to terminal 151 to periodically charge capacitors 154 and **154*a* during the ringing interval. The waveform of the charging voltage as it appears at terminal 151, is indicated at 164 in FIG. 4. Transistor $Q_3$ has the effect of chopping this charging voltage to produce pulses which are indicated at 166 in FIG. 4. As shown, the magnitudes of pulses 166 progressively decrease because of the diminishing charge on capacitor 110. It will be appreciated that capacitors 154 and 154**a are discharged during the time between successively occurring pulses.

From the foregoing it is clear that as long as ring control signal 144 is in its positive state, each of the capacitors 154 and **154*a* will alternately be charged and discharged to thereby cause continuous operation of ringers 115 and 115*a* during each ringing interval of signal 144.**

When the voltage of ring control signal 144 becomes zero during the two second silent interval, power is removed from ring converter 112. As a result, generator 146 will turn off to stop the generation of pulse train 147 and transistors $Q_5$, $Q_2$, $Q_3$ and $Q_4$ will become non-conductive.

By rendering transistor $Q_3$ non-conductive, the charging circuit for capacitors 154 and **154*a* will open, and by rendering transistor $Q_4$ non-conductive, the discharging circuit for capacitors 154 and 154a will open. Ringers 115 and 115a will therefore be silent for the two second silent interval. When ring control signal 144 resumes its positive state in the next ringing interval, operation of ringers 115 and 115*a* will be resumed. Thus, ring converter 112 is responsive to ring control signal 144 to establish the typical, cyclic, ring-pause-ring-pause operation ringers 115 and 115*a* in which ringers 115 and 115**a ring in the ringing interval and are silent in the silent interval.

The waveform of the operating voltage that is applied across the terminals of each of the ringers 115 and **115*a* is indicated at 168 in FIG. 4. As shown, this voltage has a square wave configuration and is alternating during the ringing interval because of the alternate charging and discharging of capacitors 154 and 154*a*. This alternating voltage diminishes during the ringing interval because of the diminishing charge on capacitor 110. In the silent interval, the voltage waveform 168 is at zero volts because capacitors 154 and 154*a*** are neither charging nor discharging.

From the foregoing description it will be appreciated that the charge built up on capacitor 110 furnishes the power in the form of a positive voltage for operating ringers 115 and **115*a*.**

The voltage built up across capacitor 110 is indicated at 170 in FIG. 4. As soon as transistor $Q_3$ is switched into conduction the capacitor voltage 170 begins to decrease as shown. As a result, the voltage drop across diode 114 will decrease and will therefore become less than the zener potential (160 volts in this example). Diode 114 will therefore stop conducting in its reverse avalanche mode to allow the voltage at the base of transistor $Q_1$ to become more negative. If transistor $Q_1$ was turned off at the moment transistor $Q_3$ was switched into conduction, the decrease in the voltage drop across diode 114 will render transistor $Q_1$ conductive.

Current will therefore flow through the emitter-collector of transistor $Q_1$ to oscillator 117 and will increase as the voltage drop across diode 114 continues to decrease. Oscillator 117 will therefore be turned on, and the voltage of the positive pulses which are supplied by oscillator 117 to charge capacitor 110 will build up with increasing current flow through the emitter-collector of transistor $Q_1$. Oscillator 117 will therefore be turned on to charge capacitor 110 when capacitor 110 begins to discharge through the emitter-collector of transistor $Q_3$.

During the one second ringing interval when transistor $Q_3$ is conductive, capacitor 110 will discharge more rapidly than it is being charged by the positive pulses from oscillator 117. The voltage across capacitor 110 will therefore continue to decrease during the one second ringing interval.

When the one second ringing interval terminates and the two second silent interval begins, transistor $Q_3$ will become non-conductive to open the discharging circuit for capacitor 110. Since the voltage drop across zener diode 114 is less than the zener potential at this time, oscillator 117 will remain on to continue to supply the positive pulses for charging capacitor 110. Charging of capacitor 110 will therefore continue during the two second silent interval, and since the discharging circuit for capacitor 110 is open during the silent interval, the potential difference across capacitor 110 will build up again until transistor $Q_3$ is again switched into conduction at the beginning of the next ringing interval.

It therefore will be appreciated that as soon as capacitor 110 starts to discharge, converter 108 will be effective to re-charge capacitor 110, and by proper selection of parameters, converter 108 will be effective to cause the voltage across capacitor 110 to build back up to its original value by the time that the two second silent interval expires.

By pre-selecting parameters, the voltage across capacitor 110 is built up again to the maximum value that is determined by diode 114 in a time period that is equal to or less than the summation of the one second ringing interval and the two second silent interval. For optimum efficiency, converter 108 provides just enough power input to capacitor 110 that the voltage across capacitor 110 will just reach its original maximum value at the end of the silent interval and just before the initiation of the next ringing interval. It will be appreciated that the input power required to re-charge capacitor 110 to its original predetermined value decreases as the time period of charging is increased.

Thus, for a ringing interval of one second and a silent interval of two seconds, the constant or uniform input power for charging capacitor 110 may be as small as one-third of the output power (i.e., the power drawn from capacitor 110) which is required for satisfactory operation of ringers 115 and 115*a*. For example, if the power required for operating ringers 115 and 115a during the one second ringing interval is 1 Watt, it is only necessary to provide a constant power input of one-third Watt in order to re-charge capacitor 110 to its original predetermined value preparatory to the next one second ringing interval. In this manner, the power input requirement is minimized by utilizing all of the time in both the ringing and silent intervals to charge capacitor 110. The net result is that the constant input power requirement is approximately equal to one-third of the power that would be required if full advantage was not taken of the silent interval for storing the charge on capacitor 110.

Thus for maximum efficiency, the voltage build up across capacitor 110 just reaches its limiting value (at which diode 114 begins to go into its reverse avalanche mode) at the end of the two second silent interval as shown in FIG. 4. The cyclic charging and discharging of capacitor 110 will continue until ring control signal 144 is removed.

As long as ring control signal 144 is applied to ring converter 112, oscillator 117 will be on to generate the positive pulses for charging capacitor 110. The pulse train output of oscillator 117 is indicated at 172 in FIG. 4.

When ring control signal 144 is removed, as by placing either or both of telephones 60 and 62 off-hook, oscillator 117 will remain on until the voltage build up across capacitor 110 is sufficient to cause diode 114 to conduct in its reverse avalanche mode.

With the circuit of this invention it is clear that the electrical charge which is stored by capacitor 110 constitutes the emf source for ringing ringers 115 and 115*a*. It also will be appreciated that the power for charging capacitor 110 is derived only from transmission line 42 and that this power is supplied to line 42 by the central office d.c. source. Source 28 therefore supplies the potential to charge capacitor 110, and the charge on capacitor 110 is utilized to operate ringers 115 and 115*a*, thereby eliminating the need for a local battery at the subscriber's terminal for operating the ringers or other telephone signalling devices.

In place of generator 146, it will be appreciated that other types of multi-vibrators may be utilized such as, for example, a sine wave oscillator or a sawtooth generator. The subscriber terminal units 45-47 are the same as and operate in the same manner as unit 44.

Figure 5:
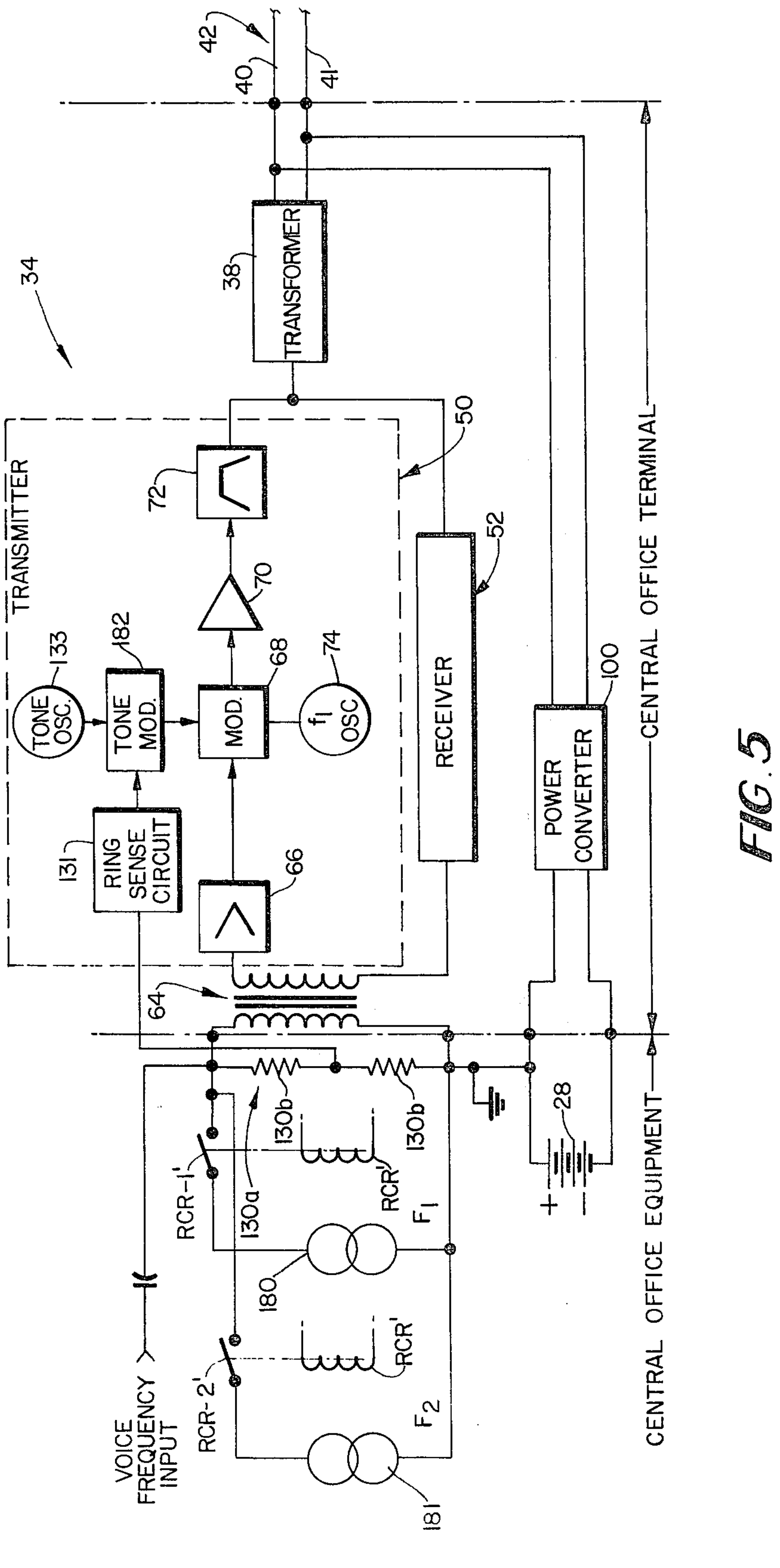
FIG. 5 is a schematic diagram of a modified central office circuit for multi-party ringing.
Figure 6:
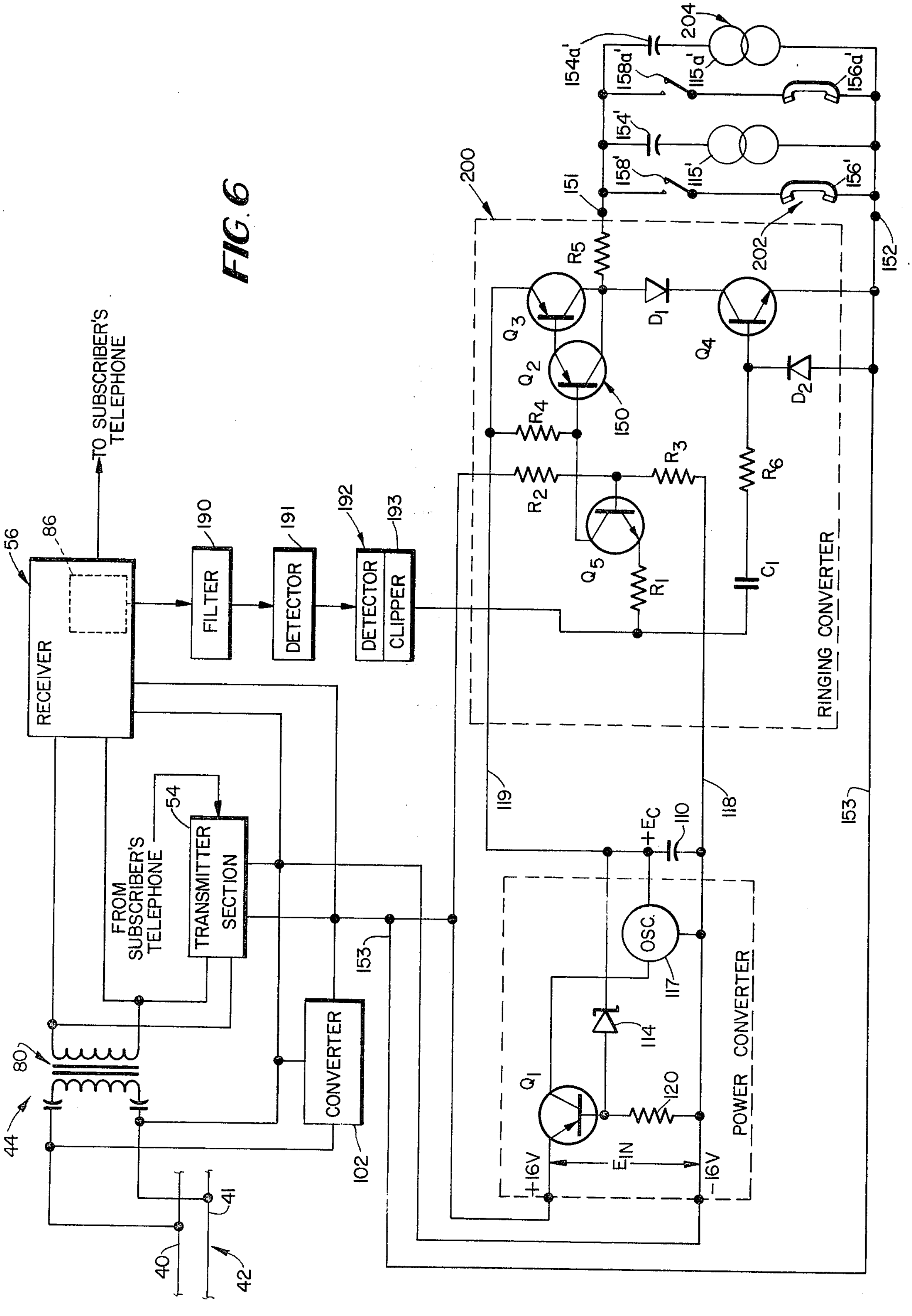
FIG. 6 is a modification of the circuit shown in FIG. 3 to provide for multi-party ringing.

FIGS. 5 and 6 illustrate a carrier system which incorporates the ringing generator circuit of this invention and which is equipped to provide for multi-party ringing. Multi-party ringing is utilized when two or more subscribers are serviced by the same channel in the carrier system. To the extent that the system of FIGS. 5 and 6 is the same as that shown in FIGS. 1-3, like reference characters have been applied to designate like parts and components.

As shown in FIG. 5, the central office station is the same as that shown in FIGS. 1 and 2 except that ringing generator 30 is replaced by as many ringing generators as there are party line subscribers for a given channel. In this embodiment two ringing generators 180 and 181 are provided for. In addition to the replacement of generator 30 by generators 180 and 181, tone switch 132 is replaced by a multi-party tone modulator 182.

Each of the generators 180 and 181 generates an a.c. ringing signal which corresponds to signal 130. However, the frequencies of the signals generated by generators 180 and 181 are different preselected values. The a.c. ringing signal, which is generated by generator 180, is indicated at 208 in FIG. 7.

The subscribers' terminal unit shown in FIG. 6 is substantially the same as that shown in FIG. 3 except that a modified form of ring converter is utilized in place of converter 112. In addition, filter 140 and detector 142 are replaced by a filter 190 and detectors 191 and 192.

The modified multi-party ring converter is indicated at 200 in FIG. 6. Converter 200 is the same as converter 118 except that generator 146 is eliminated and resistors $R_2$ and $R_3$ are connected in series between the positive and negative output terminals of converter 102. In this embodiment detector 192 has a clipper output stage 193 which is connected to one plate of capacitor $C_1$ and through resistor $R_1$ to the emitter of transistor $Q_5$. The ringing generator circuit of FIG. 6 is otherwise the same as the ringing generator circuit which is shown in FIG. 3, and to the extent that the circuits are the same, like reference characters have been applied to designate like parts and components.

The telephones for the multi-party subscribers are generally indicated at 202 and 204 in FIG. 6. Telephones 202 and 204 are connected in parallel to the ringing output terminals 151 and 152 of ringing converter 200.

Telephones 202 and 204 are the same as telephones 60 and 62. Accordingly like reference characters have been applied to designate like parts with the exception that the reference characters designating the parts of telephones 202 and 204 have been primed. The operating frequencies of ringers 115' and 115*a*' are matched to the frequencies of the a.c. ringing signals which are respectively generated by generators 180 and 181.

Upon dialing the subscriber who is serviced by telephone 202, the central office ring control circuit, which is indicated at RCR' in FIG. 5, operates to close contacts RCR-1', thereby electrically connecting generator 180 across voltage divider 130*a*.

Ring sense circuit 131, upon sensing the a.c. ringing signal 208, applies a periodic modulating signal to tone modulator 182. The modulating signal which is supplied by circuit 131 will have ringing and silent intervals which are coincident with the ringing and silent intervals of signal 208. During the ringing interval this modulating signal will have the same frequency as signal 208.

Tone modulator 182 is effective to modulate the amplitude of the 750 cycle tone with the modulating signal that is supplied by circuit 131. The modulated 750 cycle tone is applied to modulator 68, and modulator 68 is effective to modulate the amplitude of the carrier signal with the modulated 750 cycle tone. Thus, the carrier signal, which is generated by oscillator 74, will be modulated during the one second ringing interval by the modulated 750 cycle tone. The modulated carrier signal waveform which is transmitted by unit 34 is indicated at 209 in FIG. 7.

It will be appreciated that the circuit for producing the modulated carrier signal 209 is conventional. The modulated carrier signal 209 may be produced in various different ways which are known in the art.

Detector 86 detects, or demodulates, the modulated carrier signal 209 to develop at its voice frequency output the 750 cycle signal whose amplitude is still modulated by the signal which was supplied by circuit 131. In this embodiment detector 86 is effective to smooth out the carrier signal, but not the amplitude-modulated 750 cycle tone which was imposed on the carrier signal.

Figure 7:
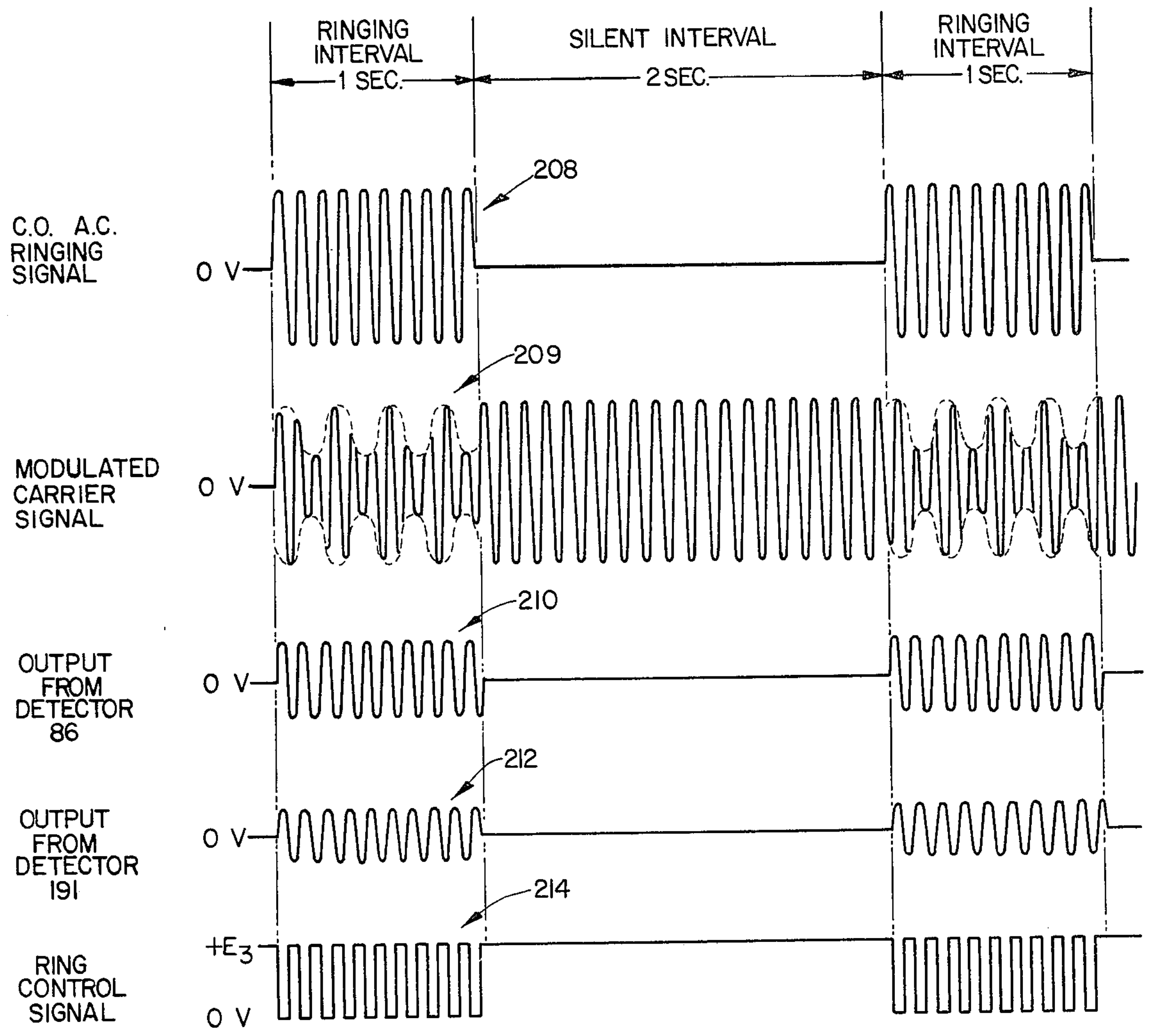
FIG. 7 is a waveform chart which graphically illustrates various signals that are developed in the circuits shown in FIGS. 5 and 6.

The demodulated ringing signal which is supplied at the voice frequency output of detector 86 is indicated at 210 in FIG. 7. As shown, signal 210 is intermittent and has the same ringing and silent intervals as the central office a.c. ringing signal 208. The ringing and silent intervals of signal 210 are substantially coincident with the ringing and silent intervals of signal 208.

The ringing signal 210 is applied to the input of filter 190 which is tuned only to the 750 cycle frequency of signal 210. As a result, filter 190 will pass signal 210 to the input of detector 191.

Detector 191 detects, or demodulates, the 750 cycle signal to recover the ringing frequency signal which is indicated at 212 in FIG. 7. Detector 191, in demodulating signal 210, is effective to smooth out the 750 cycle tone, but not the ringing frequency signal 212. Like signal 210, signal 212 is intermittent and has the same ringing and silent intervals as signals 210 and 208.

Signal 212 is applied to the input of detector 192 which detects the presence or absence of signals 212 to develop the intermittent, multi-party ring control signal which is indicated at 214 in FIG. 7. Ring control signal 214 has the same ringing and silent intervals as signals 212 and 208. The ringing and silent intervals of ring control signal 214 are substantially coincident with the ringing and silent intervals of signal 208.

During the silent interval, ring control signal 214 is at a steady positive voltage ($+E_3$) which is sufficiently high, when applied to the emitter of transistor $Q_5$, to render transistor $Q_5$ non-conductive. During each ringing interval, ring control signal 214 is a zero volt to $+E_3$ volt pulse train in which the constant repetition frequency of pulses is the same as the ringing interval frequency generated off signal 208. Several pulses will be developed during each ringing interval. When ringing generator 180 is disconnected from unit 34 and the modulation of the carrier signal ceases, ring control signal 214 will be at its positive $+E_3$ voltage level.

It will be appreciated that ring control signal 214 may be developed in various different ways that are known in the art.

As shown in FIG. 5, ring control signal 214 is applied to the emitter of transistor Q5 and to capacitor $C_1$. During the two second silent interval, the voltage at the emitter of transistor $Q_5$ will be more positive than the voltage applied to the base of transistor $Q_5$. As a result, transistor $Q_5$ will be rendered non-conductive to render transistors $Q_2$ and $Q_3$ nonconductive. When the voltage of ring control signal 214 is $+E_3$, diode $D_2$ will be forward biased to discharge capacitor $C_1$. As a result, transistor $Q_4$ will also be non-conductive during the two second silent interval.

During the one second ringing interval, the pulses of ring control signal 214 are effective to operate transistors $Q_2$-$Q_5$ in the previously described manner. Thus, when the pulse train of signal 214 is at zero volts, transistors $Q_5$, $Q_2$ and $Q_3$ will be conductive and transistor $Q_4$ will be non-conductive. When the pulse train of signal 214 is at its positive d.c. level, $+E_3$, transistors $Q_5$, $Q_2$ and $Q_3$ are rendered non-conductive, and transistor $Q_4$ is rendered conductive.

When transistors $Q_3$ and $Q_4$ are respectively conductive and non-conductive, capacitors 154' and 154*a*' will be charged by the charge that is stored by capacitor 110, and when transistors $Q_3$ and $Q_4$ are respectively non-conductive and conductive, capacitors 154' and 154*a*' will be discharged, all in the manner that was previously described for the embodiment shown in FIG. 3. Thus, the waveform of the voltage applied to terminal 151 will correspond to the voltage waveform 164. In this multiparty embodiment, however, the frequency of the positive pulses which are applied to terminal 151 during the one second ringing interval will correspond to the frequency of the a.c. central office ringing signal 208 and will be matched to the operating frequency of only one of the ringers of the party line telephones.

For party line operation it will be appreciated that the ringer or other signalling device of each party line telephone has a different operating frequency. In this embodiment, for example, generator 180 provides the operating frequency for telephone 202, and generator 181 provides the operating frequency for telephone 204. Thus, when generator 180 applies the a.c. ringing signal to ring signal circuit 131, the frequency of the voltage waveform at terminal 151 during the one second ringing interval will be effective to operate ringer 115', but not ringer **115*a*'. If, on the other hand, generator 181 were connected to apply the a.c. ringing signal to ring signal circuit 131, the frequency of the voltage waveform at terminal 151 during the one second ringing interval will be effective to operate ringer 115*a*', but not ringer 115'**.

The waveform of the voltage which is applied across the terminals of each of the ringers 115' and **115*a*' will correspond to the ringing voltage waveform 168, but the frequency of this voltage in this multi-party embodiment will depend upon and correspond to the frequency of the a.c. ringing signal that is applied to unit 34.**

With regard to the embodiments shown in FIGS. 1–7, the reason for connecting the input of power converter 108 to the output of converter 102 is that converter 102 usually provides a conveniently accessible supply of power that is derived from transmission line 42. It will be appreciated, however, that the input of converter 108 could readily be connected directly to the transmission line in the manner shown in FIG. 8. The ring converter circuit shown in FIG. 8 is the same as that shown in FIG. 3.

Figure 8:
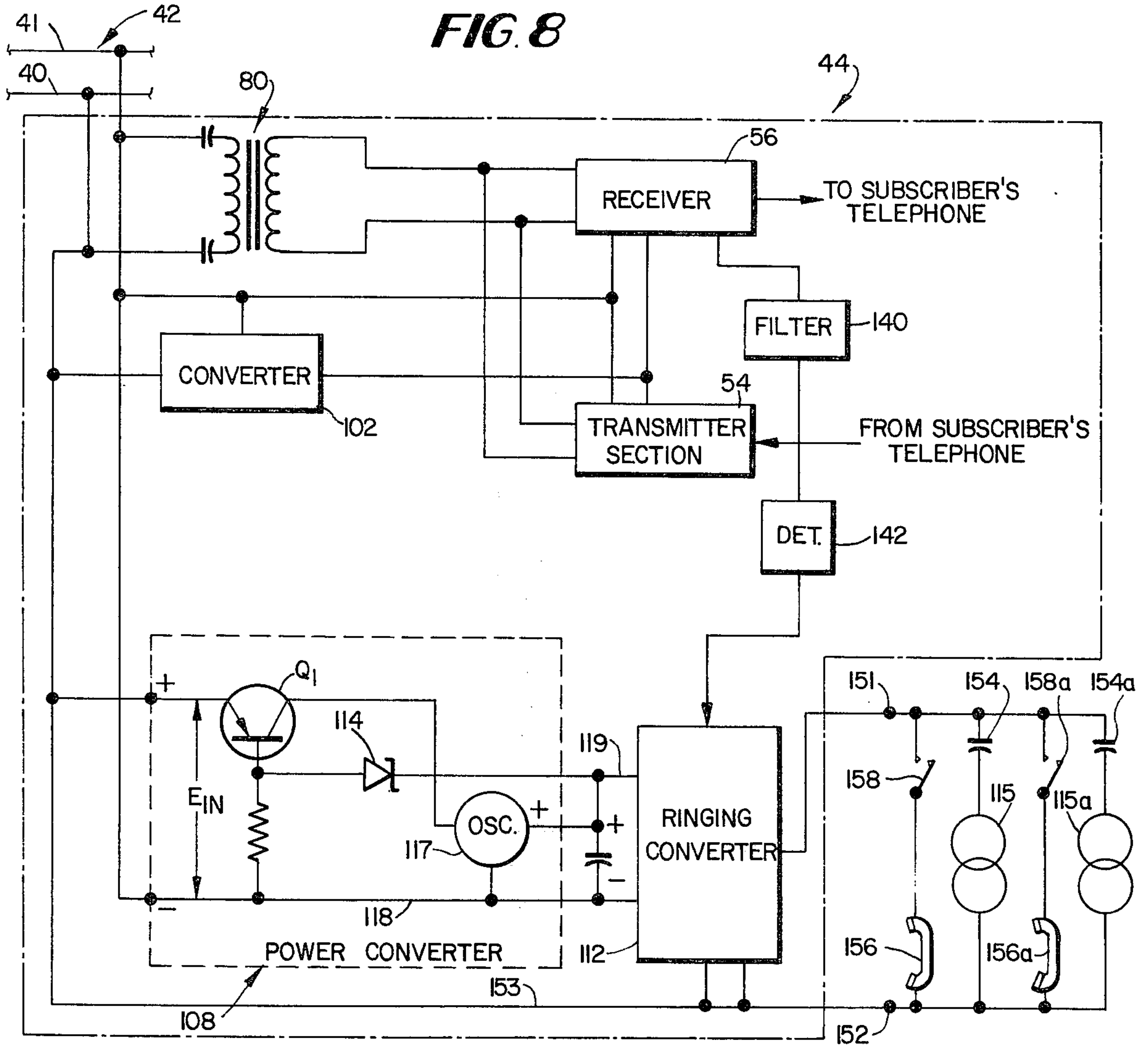
FIG. 8 is a schematic circuit diagram of the subscriber terminal unit which incorporates another embodiment of this invention.

Referring to FIG. 8, the emitter of transistor $Q_1$, instead of being connected to the output of converter 102, is connected directly to the transmission line conductor 40, and conductor 118 is connected directly to the transmission line conductor 41. Therefore, the power input to converter 108 is directly derived from transmission line 42 before the voltage is stepped down by converter 102.

It will be appreciated that the power converter in the ring generator circuit of FIG. 5 may also be connected directly to transmission line 42 in the manner shown in FIG. 8.

Figure 9:
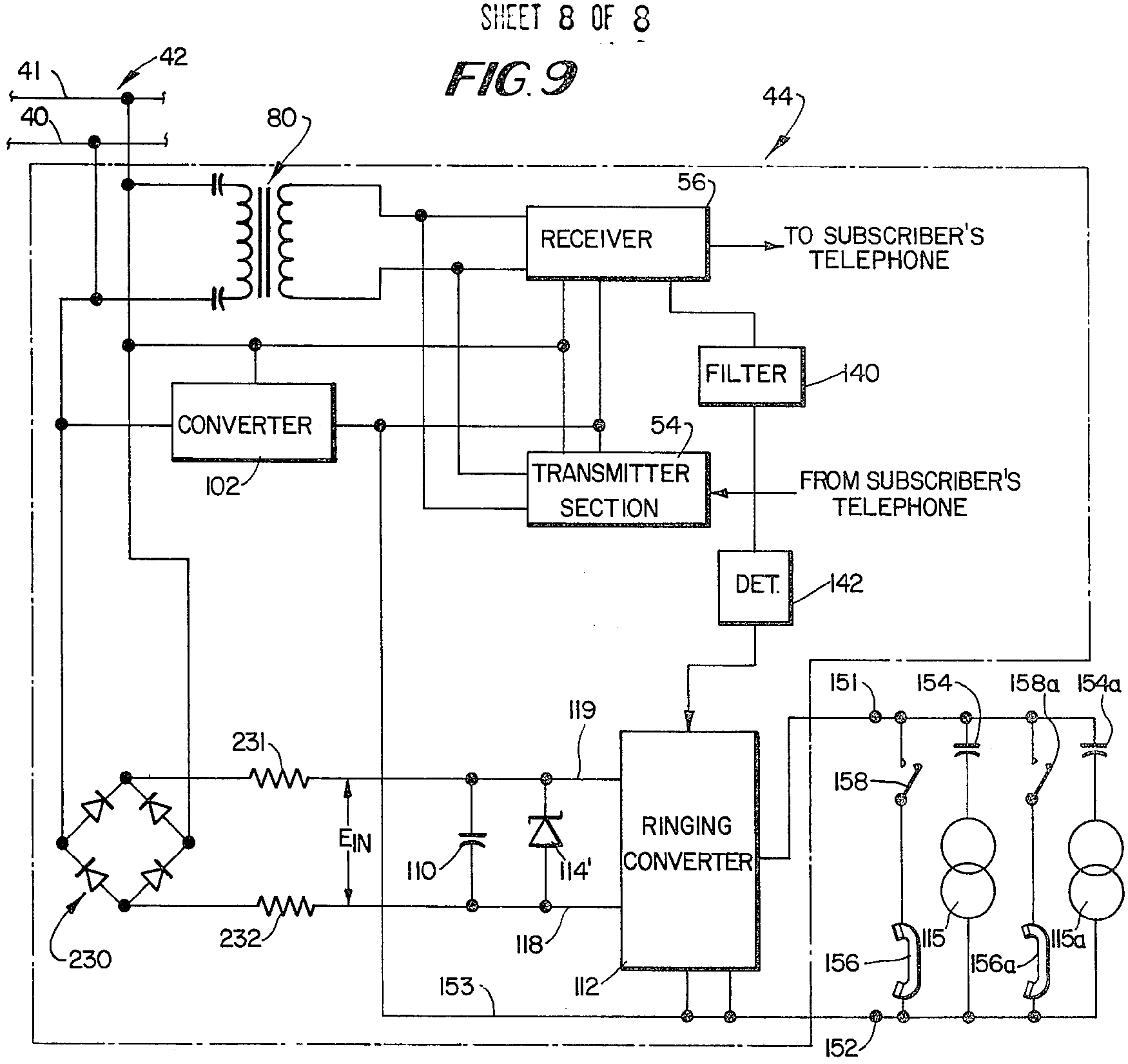
FIG. 9 is a schematic diagram of the subscriber terminal unit which incorporates still another embodiment of this invention.

If the d.c. bias, which is applied by source 28 to the transmission line conductors 40 and 41, is sufficiently high to charge capacitor 110 to the desired voltage, power converter 108 could be eliminated as shown in FIG. 9. To the extent that the embodiment of FIG. 9 is the same as that shown in FIG. 3, like reference characters have been applied to designate like parts and components.

In the embodiment shown in FIG. 9, transistor $Q_1$, oscillator 117 and diode 114 have been replaced by a diode bridge rectifier 230 and a zener diode 114'. The input terminals of rectifier 230 are connected to the transmission line conductors 40 and 41. The positive output terminal of rectifier 230 is connected through a voltage dropping resistor 231 to one plate of capacitor 110, to the cathode of diode 114' and to conductor 119. The other output terminal of rectifier 230 is connected through another voltage dropping resistor 232 to the other plate of capacitor 110, the anode of diode 114' and conductor 118. Diode 114' and capacitor 110 are connected in parallel across conductors 118 and 119. The voltage applied across capacitor 110 and diode 114' will be positive with respect to ground and will be equal to the voltage at the output terminals of rectifier 232 less the voltage drop across resistors 231 and 232. Conductor 119 connects the positive plate of capacitor 110 to the emitter of transistor $Q_3$ as described in connection with the embodiment of FIG. 3.

The remainder of the ring generator circuit of FIG. 9 is the same as that shown in FIG. 3.

From the foregoing description it will be appreciated that rectifier 230 draws power from transmission line 42 and applies a d.c. voltage across capacitor 110 to charge the capacitor. The zener potential of diode 114' depends upon the working voltage of the capacitor 110, and the selected working voltage of capacitor 110 depends upon the voltage that is needed to operate ringers 115 and **115*a*. As an example, the capacitor working voltage in this embodiment may be 130 volts. Thus, the zener potential of diode 114'** will be 130 volts.

Thus, as long as the voltage built up across capacitor 110 is less than 130 volts, diode 114' will be reverse biased and hence non-conducting. The current flowing through rectifier 230 will therefore build up the voltage across capacitor 110.

When the voltage across capacitor 110 reaches approximately 130 volts, diode 114' will conduct in an avalanche mode. As a result, further build up of voltage across capacitor 110 will be prevented. Without diode 114' it will be appreciated that capacitor 110 would be charged to the available voltage which could be significantly greater than the working voltage of the capacitor.

When transistor $Q_3$ is switched into conduction in response to ring control signal 144, capacitor 110 will begin to discharge through conductor 119 and the emitter-collector of transistor $Q_3$ to charge capacitors 154 and 154a in the previously described manner. As a result, the voltage across capacitor 110 diminishes, and when it becomes less than the zener potential of diode 114', diode 114' will cease conducting in its avalanche mode and will become non-conductive to enable the available voltage at the output terminals of rectfifier 230 to re-charge the capacitor. The charging power in this embodiment is established by the voltage across the conductors of line 42 and the ohmic values of resistors 231 and 232.

From the foregoing description it will be appreciated that the waveform of the voltage which is built up across capacitor 110 in FIG. 9 will be similar to the voltage waveform 170. During the one second ringing interval, the charge on capacitor 110 will diminish, and during the two second silent interval the charge on capacitor 110 will build up again to its original value which is determined and limited by diode 114'. For each ringing interval, therefore, there will be an adequate charge stored by capacitor 110 to operate ringers 115 and **115*a*.**

Figure 10:
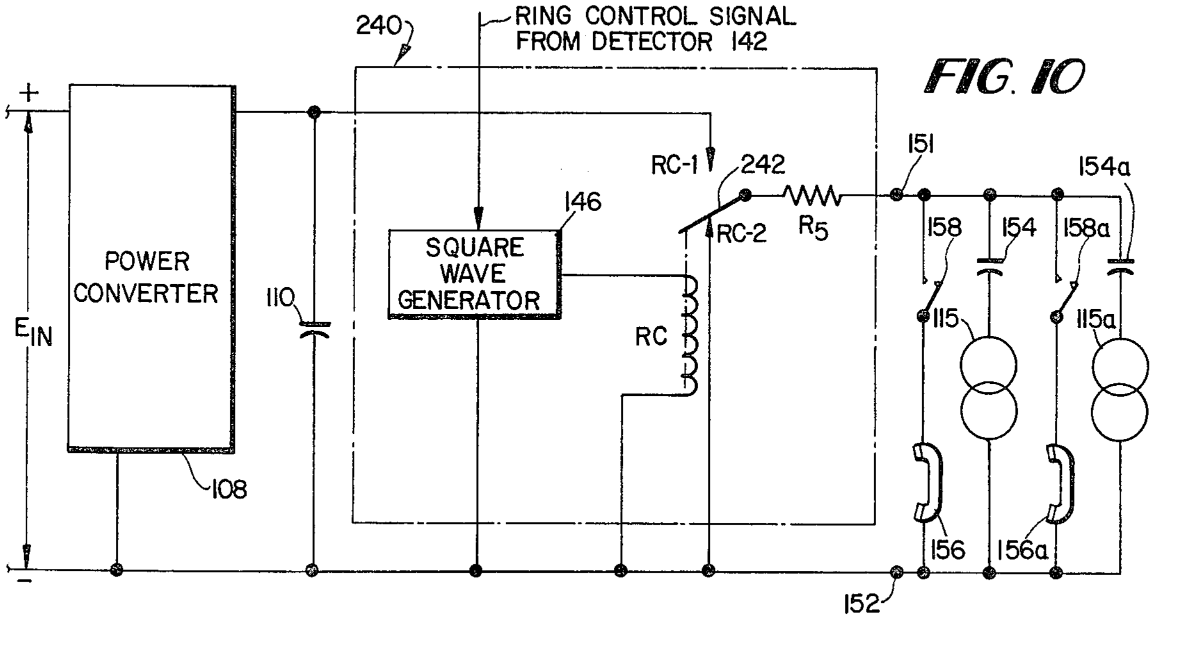
FIG. 10 is a schematic diagram of a modified form of the ringing converter for the circuit of this invention.

The embodiment shown in FIG. 10 includes a modified ringing converter 240 for single party ringing. To the extent that the circuits of FIGS. 3 and 10 are alike, like reference characters have been applied to designate like parts and components.

As shown in FIG. 10, converter 240 includes a C-type relay RC in addition to generator 146 and resistor $R_5$. Ring control signal 144 is applied to the input of generator 146 as previously described. The operating winding of relay RC has one of its terminals connected to the output of generator 146 and the other of its terminals connected to conductor 118.

Relay RC has a normally open contact RC-1 and a normally closed contact RC-2. Contact RC-1 is connected by conductor 119 to the positively charged plate of capacitor 110, and contact RC-2 is connected to conductor 118. The movable contactor of relay RC is indicated at 242 and is connected through resistor $R_5$ to terminal 151.

The pulse train 147, which is generated by generator 146 when signal 144 is positive, is applied to winding of relay RC with the result that relay RC will alternately be energized and de-energized. When relay RC is energized, contactor 242 closes contact RC-1 and opens contact RC-2.

By closing contact RC-1 the circuit for discharging capacitor 110 is completed, and by opening contact RC-2 the discharging circuit for capacitors 154 and 154*a* is opened. As a result, the voltage built up across capacitor 110 will cause current to flow through conductor 119, contact RC-1, contactor 242, and resistor $R_5$ to charge capacitors 154 and 154*a.*

When the pulse train output of generator 146 switches to its zero voltage state, relay RC will de-energize, causing contacts RC-1 to open and contacts RC-2 to close. Thus, the discharging circuit for capacitor 110 will open, and the discharging circuit for capacitors 154 and 154*a* will be completed. Capacitors 154 and 154*a* will therefore discharge through resistor $R_5$, contactor 242 and contact RC-2 to conductor 118. The cyclic charging and discharging of capacitors 154 and 154*a* will, as previously described, cause continuous operation of ringers 115 and 115*a* during the one second ringing interval.

Thus, the voltage waveform applied to terminal 151 will correspond to the voltage waveform 164.

When signal 144 switches to zero volts during the two second silent interval, generator 146 will turn off, and the output of generator 146 therefore goes to zero to de-energize relay RC. Contacts RC-1 are therefore open to open the discharging circuit for capacitor 110, and the voltage across capacitor 110 will be built up again as previously described. When capacitors 154 and 154*a* completely discharge through contacts RC-2, ringers 115 and 115*a* will stop ringing, and since the RC time constant for capacitors 154 and 154*a* is relatively short, ringers 115 and 115*a* will be off for substantially the entire two second interval.

Because of relay RC, the cost of manufacturing ringing converter 240 will be somewhat more expensive than the manufacturing costs for converter 112 or 214. Because of contact erosion in relay RC, the operating life of converting 240 is shorter than that of converter 112 and 214. Converter 240, on the other hand, is more simplified as compared with converters 112 and 214.

Figure 11:
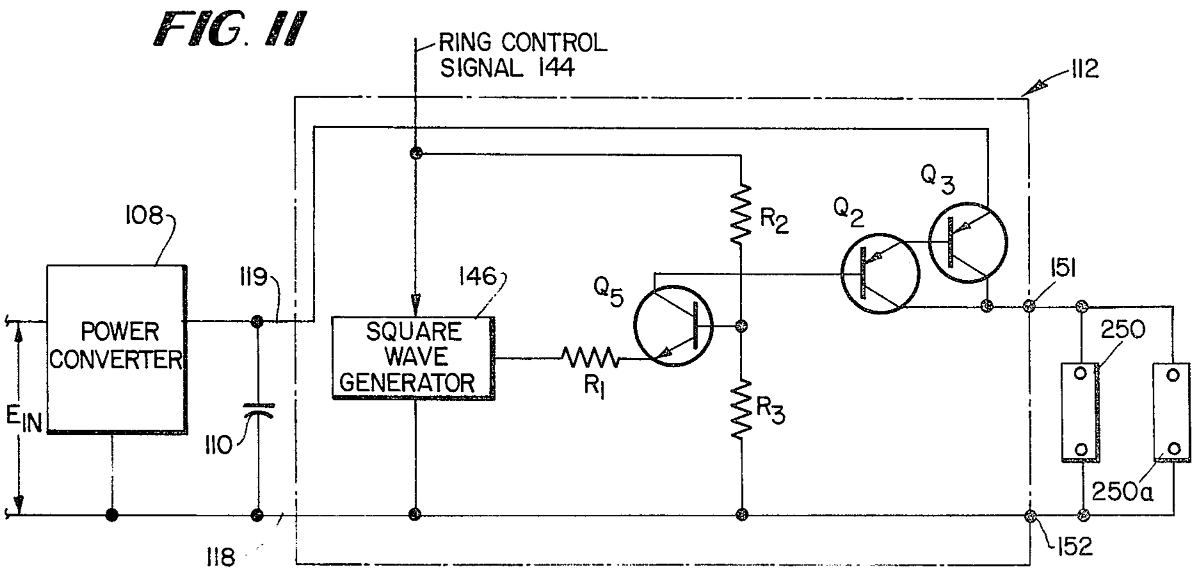
FIG. 11 is a fragmentary schematic diagram of a ringing generator circuit for use with a non-reactive signalling device.

In place of ringer 115 and 115*a* it will be appreciated that other types of signalling devices, such as buzzers and lamps, may be utilized and energized by the ringing generator circuits of this invention. As compared with ringers 115 and 115a, which constitute reactive loads, buzzers are non-reactive loads. If the ringers 115 and 115a and their associated capacitors 154 and 154*a* are replaced by buzzers 250 and 250*a* (See FIG. 11), capacitor $C_1$, transistor $Q_4$, diodes $D_1$ and $D_2$ and resistors $R_5$ and $R_6$ are unnecessary and may, if desired, be eliminated from ringing converter 112 as shown in FIG. 11. In this embodiment, terminals 152 is connected to conductor 118 as shown.

In FIG. 11, operation of transistors $Q_2$, $Q_3$ and $Q_5$ is the same as that described for the embodiment shown in FIG. 3. In particular, transistors $Q_2$, $Q_3$ and $Q_5$ will be conductive when pulse train 147 is switched to its positive state and will be non-conductive when pulse train 147 is switched to its zero voltage state. When transistor $Q_3$ is conductive during the ringing interval, the circuit for discharging capacitor 110 will be completed. As a result, the voltage built up across capacitor 110 will cause current to flow through transistor $Q_3$ and through buzzers 250 and 250a to conductor 118. Therefore, buzzers 250 and 250a will be energized in response to the occurrence of pulses 147.

The ringing generator circuit of this invention may also be utilized in the type of carrier system which is described in U.S. Pat. No. 3,624,300 which issued to Lester Q. Krasin et al on Nov. 30, 1971 for Central Office Terminal Unit For Telephone Carrier System. In this type of system two subscribers are serviced by the same telephone transmission line, one subscriber being at voice frequency, and the other subscriber being on a carrier frequency channel.

Because voice frequency signals are transmitted by the transmission line in the type of system which is described in U.S. Pat. No. 3,624,300, a local battery is needed at the location of the subscriber who is on the carrier frequency channel in order to supply d.c. operating power to the subscriber's carrier equipment. By utilizing the ringing generator circuit of this invention, however, the power and storage requirements of this local battery is reduced because this invention makes it unnecessary to use the local battery for ringing the subscriber's telephone.

In the system described in U.S. Pat. No. 3,624,300 the ringing signal, which is transmitted by the transmission line to ring the telephone, the subscriber who is serviced by the carrier frequency channel, may be an unmodulated, periodically occurring or intermittent carrier frequency signal which is present for the one second ringing interval and absent for the two second silent interval. Detectors at the subscriber's terminal unit are effective, in response to this intermittent carrier frequency signal, to develop the ring control signal (144 or 214) in a manner similar to the embodiments of FIGS. 3 and 6. The thusly developed ring control signal is applied to the ringing converter in the ringing generator circuit of this invention to ring the subscriber's telephone with the charge which is stored on capacitor 110.

By stating or claiming that the storage capacitor (110) is charged during the intermittent ringing and silent intervals, it will be appreciated and understood that the capacitor is not necessarily charged throughout the entireties of the intervals and that the statement is intentionally broad enough within the dictionary meaning of the word "during" to cover conditions in which the capacitor is charged at some point in the course of each interval for a period of time that is less that the duration of each interval.

It will be appreciated that the waveforms shown in FIGS. 4 and 7 are not necessarily true representations of the actual frequencies and amplitudes of the signals in the previously described circuits.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A ringing generator circuit for energizing the signalling device of a telephone in a telephone transmission system having (a) a transmission line which provides a connection for transmitting signals between a central office and said telephone, (b) a d.c. power source located at said central office and electrically connected to said line to apply voltage thereto, and (c) means for providing a pre-selected signal to signal an incoming call for said telephone, said ringing generator circuit comprising a capacitor for storing an electrical charge to provide a source of emf for energizing said signalling device, means responsive to said pre-selected signal to apply the charge stored by said capacitor to energize said signalling device, and circuit means electrically connecting said capacitor to said line to charge said capacitor from said d.c. power source, said circuit means comprising an oscillator having an output connected to one terminal of said capacitor to build up the voltage across said capacitor, a transistor connected to the input of said oscillator for controlling the supply of current thereto, and a zener diode connected between the base terminal of said transistor and said one terminal of said capacitor, said diode being effective to control the amount of current conducted by said transistor to limit the voltage build-up across said capacitor to a pre-selected magnitude.

2. In a telephone carrier transmission system having at least one telephone, a ringer for said telephone, a first capacitor connected in series with said ringer and effective upon being alternately charged and discharged to energize said ringer, a two-conductor transmission line providing a connection for transmitting signals between a central office and said telephone, a d.c. power source located at said central office and electrically connected to said line to apply voltage thereto, and means for supplying a pre-selected signal to signal an incoming call for said telephone, the improvement comprising a second capacitor, means electrically connecting said second capacitor to said line to charge said second capacitor from said d.c. power source, and a circuit responsive to said pre-selected signal for alternately charging said first capacitor from the charge which is stored by said second capacitor and discharging said first capacitor.

3. The telephone carrier transmission system defined in claim 2 wherein said circuit comprises means under the control of said pre-selected signal for supplying a switching signal, and switching means under the control of said switching signal to alternately complete intermittent charging and discharging circuits for said first capacitor, said charging circuit, upon being completed, providing a current-conducting circuit connection between said first and second capacitors to charge said first capacitor from current flow that is caused by the voltage built up across said second capacitor.

4. The telephone carrier transmission system defined in claim 3 wherein said switching means comprises transistor means.

5. The telephone carrier transmission system defined in claim 2 wherein said circuit comprises first and second transistors, and a pulse generator responsive to said pre-selected signal to supply pulses to said transistors for alternately switching said transistors into conduction, said first transistor being effective upon being switched into conduction to complete a circuit between said first and second capacitors to charge said first capacitor with flow of current that is caused by the voltage built up across said second capacitor, and said second transistor being effective upon being switched into conduction to complete a circuit for discharging said first capacitor.

6. In a telephone carrier transmission system, at least one carrier channel unit, at least one subscriber terminal unit, at least one telephone electrically connected to said subscriber terminal unit, said carrier channel unit being located at a central office station, and said subscriber terminal unit being located at a subscriber's station which is remote from said central office station, said carrier channel unit having means for continuously transmitting a carrier signal of pre-selected frequency and for modulating said carrier signal with a preselected signal to signal an incoming call to said telephone a two-conductor transmission line providing a signal-transmitting connection between said units for transmitting carrier signals from one unit to the other, a capacitor at said subscriber's station, means electrically connecting said capacitor to said line, a source of d.c. potential located at said central office station and electrically connected to said line to supply current for charging said capacitor, means in said subscriber terminal unit for detecting the carrier signal which is modulated by said preselected signal to derive a predetermined signal, and a circuit responsive to said predetermined signal for applying the charge stored by said capacitor to ring said telephone.

7. A method of energizing a signalling device which is associated with a subscriber's telephone to signal an incoming call in a telephone carrier system which has a transmission line for transmitting signals between said telephone and a central office, said method comprising the steps of feeding direct current over said line from a d.c. power source at said central office to charge a capacitor at the subscriber's end of said line, and applying the charge stored by said capacitor to energize said signalling device upon the occurrence of a preselected modulation of a carrier signal.

8. A method of ringing a ringer of a subscriber's telephone in a telephone carrier system which has a transmission line for transmitting signals between said telephone and a central office, said method comprising the steps of feeding current over said line from a d.c. power source which is located at said central office to charge a capacitor at the subscriber's end of said line in preparation for ringing said ringer, causing said ringer to have alternately occurring ringing and silent intervals in which said ringer is respectively energized and de-energized by discharging said capacitor only during said ringing intervals to provide for flow of current through said ringer during said ringing intervals, and re-charging said capacitor from said source during said ringing intervals and said silent intervals to at least substantially restore said voltage to said pre-selected value by the time each of the ringing intervals is initiated.

9. A method of energizing the ringer of a subscriber's telephone which is located remotely from a central office in a telephone carrier system, said method comprising the steps of charging a capacitor from current supplied by a d.c. voltage source which is located at said central office in preparation for ringing said ringer, causing said ringer to have alternately occurring ringing and silent intervals in which said ringer is respectively energized and de-energized by discharging said capacitor to energize said ringer only during the ringing intervals, and recharging said capacitor from said source during said ringing and said silent intervals and independently of the discharging of said capacitor as long as the voltage across said capacitor is below a pre-selected value.

10. A method of energizing a ringer of a subscriber's telephone in a telephone carrier system which has a transmission line for transmitting signals between said telephone and a central office, said method comprising the steps of feeding current over said line from a direct current source which is located at said central office to charge a capacitor at the subscriber's end of said line in preparation for energizing said ringer, supplying a pre-selected signal having alternately occurring ringing and silent intervals at said central office to signal a call coming into said telephone, modulating a carrier signal with said preselected signal and transmitting the modulated carrier signal down said line to a subscriber's station at which said telephone is located, detecting said modulated carrier signal at said station to derive a predetermined signal which has ringing and silent intervals corresponding to that of said pre-selected signal, utilizing the charge stored by said capacitor to effect the flow of alternating current through said ringer to energize said ringer during each occurrence of only the ringing intervals of said predetermined signal, and recharging said capacitor from said source during both the ringing and silent intervals of said predetermined signal.

11. A ringing generator circuit for energizing the signalling device of a telephone which is electrically connected to a subscriber terminal unit in a telephone carrier system having (a) a transmission line connecting said subscriber terminal unit to a central office station, (b) a direct current source located at said central office station and electrically connected to said line, (c) a transmitter at said central office for applying a carrier signal to said line and for modulating said carrier signal with a pre-selected signal to signal an incoming call to said telephone, and (d) means at said subscriber terminal unit for detecting the carrier signal which is modulated by said preselected signal to derive a predetermined signal, said ringing generator circuit comprising a capacitor, means adapted to electrically connect said capacitor to said line to charge said capacitor by current fed over said line from said source, and circuit means responsive to said predetermined signal for applying the charge stored on said capacitor to energize said signalling device.

12. The ringing generator circuit defined in claim 11, wherein said means adapted to electrically connect said capacitor to said line comprises a d.c.-to-d.c. converter which applies a stepped-up pulsating voltage for charging said capacitor.

13. The ringing generator circuit defined in claim 4 wherein signalling device comprises a ringer, wherein said predetermined signal has different alternately occurring voltage conditions, and wherein said circuit means responsive to said predetermined signal comprises a circuit controlled by said voltage conditions to energize and thereby ring said ringer only during intermittent intervals which are interrupted by silent intervals in which said ringer is de-energized.

14. The ringing generator circuit defined in claim 4 wherein said means adapted to electrically connect said capacitor to said line comprises a circuit which applies a charging voltage across said capacitor and which is independent of said circuit means.

15. The ringing generator circuit defined in claim 11 wherein said circuit means comprises a circuit for discharging said capacitor independently of the instantaneous polarity of said carrier signal.

16. The ringing generator circuit defined in claim 11 wherein said circuit means comprises a switching circuit for discharging said capacitor and wherein said means adapted to electrically connect said capacitor to said line comprising a circuit which is effective to apply a charging voltage across said capacitor independently of whether said switching circuit is discharging said capacitor as long as the voltage across said capacitor is less than a pre-selected value.

17. The ringing generator circuit defined in claim 12 wherein said converter comprises an oscillator which supplies said pulsating voltage and means for turning off said oscillator in response to an increase in voltage across said capacitor to a preselected value.

18. The ringing generator circuit in claim 11 wherein said signalling device comprises a ringer and wherein said circuit means comprises a circuit for operating said ringer at a frequency which is independent of the frequency of said carrier signal.

19. The ringing generator circuit defined in claim 11, including means for capacitively coupling said circuit means to said signalling device and cooperating with said circuit means for feeding alternating current through said signalling device for energizing said signalling device.

20. In a telephone signalling circuit for signalling an incoming call for a telephone instrument in a telephone carrier system having (a) a transmission line connecting a subscriber terminal unit to a central office, (b) a direct current source located at said central office and electrically connected to said line to apply d.c. voltage to the line, (c) a transmitter at said central office for applying a carrier signal to said line and for modulating said carrier signal with a pre-selected signal to signal an incoming call to said telephone instrument, and (d) means at said subscriber terminal unit for detecting the carrier signal which is modulated by said pre-selected signal to derive a pre-determined signal, said signalling circuit comprising a ringer, a first capacitor connected in series with said ringer, a second capacitor, means adapted to electrically connect said second capacitor to said line to charge said second capacitor by current fed over said line from said source, and means responsive to said predetermined signal for alternately charging said first capacitor from the charge stored on said second capacitor and for discharging said first capacitor to provide for the flow of alternating current through said ringer to energize the ringer.

21. In combination with a telephone carrier transmission system having at least one telephone which has a ringer, at least one central office-located carrier channel unit which includes means for transmitting a carrier signal of pre-selected frequency and for modulating said carrier signal with a pre-selected signal to signal an incoming call to said telephone, at least one subscriber terminal unit, a transmission line providing a signal-transmitting connection between said carrier channel unit and said subscriber terminal unit for feeding said carrier signal to said subscriber terminal unit, means in said subscriber terminal unit for detecting the carrier signal which is modulated by said preselected signal to derive a predetermined signal, and a central office-located direct current source electrically connected to said line to supply direct current to said line while said carrier signal is being transmitted, a capacitor, means electrically connecting said capacitor to said line to charge said capacitor from current fed via said line from said source, and a circuit electrically connected to said ringer, said capacitor and said detecting means and responsive to said predetermined signal to apply the charge stored by said capacitor to ring said ringer.

22. The combination defined in claim 13 wherein said means electrically connecting said capacitor to said line includes a circuit having an oscillator which is energized by current drawn from said source to apply a pulsating voltage across said capacitor to charge said capacitor, and means responsive to the voltage across said capacitor to turn off said oscillator when the voltage across said capacitor increases to a pre-selected value.

23. The combination defined in claim 21 wherein said means electrically connecting said capacitor to said line comprises a d.c.-to-d.c. converter which applies a stepped-up voltage to charge said capacitor.

24. The combination defined in claim 21 wherein said pre-selected signal when signalling an incoming call intermittently modulates said carrier signal to provide alternating ringing and silent intervals in which said carrier signal is respectively modulated and unmodulated by said pre-selected signal, wherein said detecting means provides said predetermined signal with an intermittent wave form which is present throughout each ringing interval, but absent throughout each silent interval, and wherein said circuit responsive to said predetermined signal is controlled by the presence and absence of said wave form to intermittently complete a circuit for feeding current from said capacitor to said ringer throughout each ringing interval and to prevent the charge on said capacitor from being applied to energize said ringer throughout each silent interval.

25. The combination defined in claim 16 wherein said means electrically connecting said capacitor to said line provides for the charging of said capacitor to a pre-selected voltage prior to the occurrence of said predetermined signal and additionally during said silent and ringing intervals and at a rate which is slower than the rate at which said capacitor is discharged to energize said ringer, but fast enough to substantially restore the charge to said pre-selected voltage by the time each of the ringing intervals is initiated.

26. The combination defined in claim 21 wherein said means electrically connecting said capacitor to said line comprises a circuit which charges said capacitor with current drawn from said source as long as the voltage built up across said capacitor is less than a pre-selected value and independently of the instantaneous polarities of said carrier, pre-selected and predetermined signals.

27. The combination defined in claim 21 wherein said circuit responsive to said predetermined signal includes means which completes a circuit for discharging said capacitor, and wherein said means electrically connecting said capacitor to said line includes a circuit which provides for the charging of said capacitor from current drawn from said source independently of the discharging of said capacitor as long as the voltage across said capacitor is less than a pre-selected value.

28. The combination defined in claim 21, including means capacitively coupling said ringer to said circuit and cooperating with said circuit to feed alternating current through said ringer for energizing said ringer.

29. The combination defined in claim 24, including means capacitively coupling said ringer to said circuit and cooperating with said circuit to feed alternating current through said ringer for energizing said ringer.

30. A method of energizing the ringer of a subscriber's telephone in a telephone carrier system having a transmission line for transmitting signals between said telephone and a central office, said method comprising the steps of charging a capacitor at the subscriber's end of said line from current drawn via said line from a central office-located direct current source, providing a pre-selected modulation of a carrier signal to signal an incoming call to said telephone, and feeding current by way of a capacitive coupling from said capacitor to said ringer to energize said ringer with a.c. current upon the occurrence of said pre-selected modulation.

31. A method of energizing the ringer of a subscriber's telephone with alternating current in a telephone carrier system having a first capacitor in series with said ringer, and a transmission line for transmitting signals between said telephone and a central office, said method comprising the steps of charging a further capacitor at the subscriber's end of said line from current drawn via said line from a central office-located direct current source, providing a pre-selected signal to signal an incoming call to said telephone, intermittently discharging said further capacitor upon the occurrence of said pre-selected signal to intermittently charge said first capacitor, and discharging said first capacitor during each period between the successively occurring intervals in which said first capacitor is being charged to effect the alternate charging and discharging of said first capacitor for causing an alternating current to flow through the ringer to energize the ringer.

* * * * *

UNITED STATES PATENT OFFICE
CERTIFICATE OF CORRECTION

PATENT NO. : 3,904,833
DATED : September 9, 1975
INVENTOR(S) : Gerald Wayne Beene It is certified that error appears in the above-identified patent and that said Letters Patent are hereby corrected as shown below:

Column 4, line 12, change "meanas" to -- means --.

Column 5, line 39, change "or" to -- of --.

Column 8, line 18, change "turned" to -- tuned --.

Column 11, line 4, change "voltas" to -- volts --.

Column 11, line 64, change "current flow" to -- current will flow --.

Column 11, line 66, change "nonconductive" to -- non-conductive --.

Column 16, line 48, change "nonconductive" to -- non-conductive --.

Column 17, line 4, change "multiparty" to -- multi-party

Column 17, lines 9 and 10, change "te-lephones" to -- tel-ephones --.

Column 18, line 52, change "rectififier" to --rectifier -

Column 19, line 63, change "converting" to -- converter

UNITED STATES PATENT AND TRADEMARK OFFICE

CERTIFICATE OF CORRECTION

PATENT NO. : 3,904,833

DATED : September 9, 1975

INVENTOR(S) : Gerald Wayne Beene

It is certified that error appears in the above-identified patent and that said Letters Patent are hereby corrected as shown below:

Column 20, line 12, change "terminals" to -- terminal --.

Column 24, line 8, patent claim 13, change "claim 4" to -- claim 11 --.

Column 24, line 17, patent claim 14, change "claim 4" to -- claim 11 --.

Column 25, line 30, patent claim 22, change "claim 13" to -- claim 21 --.

Column 25, line 63, patent claim 25, change "claim 16" to -- claim 24 --.

Signed and Sealed this

*third* Day of *February 1976*

[SEAL]

*Attest:*

RUTH C. MASON
*Attesting Officer*

C. MARSHALL DANN
*Commissioner of Patents and Trademarks*